(12) United States Patent
Murgatroyd

(10) Patent No.: US 9,933,571 B2
(45) Date of Patent: Apr. 3, 2018

(54) PROFILING OF CLEAVED ANGLED END FACES OF OPTICAL FIBER(S)

(71) Applicant: OXFORD FIBER LTD, Rugby, Warwickshire (GB)

(72) Inventor: Ian Murgatroyd, Rugby (GB)

(73) Assignee: Oxford Fiber Ltd., Rugby (GB)

( * ) Notice: Subject to any disclaimer, the term of this patent is extended or adjusted under 35 U.S.C. 154(b) by 339 days.

(21) Appl. No.: 13/844,897

(22) Filed: Mar. 16, 2013

(65) Prior Publication Data

US 2013/0255055 A1 Oct. 3, 2013

(30) Foreign Application Priority Data

Apr. 2, 2012 (GB) .................................. 1205917.6
Sep. 19, 2012 (GB) .................................. 1216745.8
Mar. 11, 2013 (GB) .................................. 1304344.3

(51) Int. Cl.
*G02B 6/25* (2006.01)

(52) U.S. Cl.
CPC .......... *G02B 6/25* (2013.01); *Y10T 29/49801* (2015.01); *Y10T 225/12* (2015.04); *Y10T 225/321* (2015.04)

(58) Field of Classification Search
CPC ..... G02B 6/25; Y10T 225/12; Y10T 225/321; Y10T 29/49801
USPC ....... 225/2, 94, 96, 96.5, 100, 103, 104, 105
See application file for complete search history.

(56) References Cited

U.S. PATENT DOCUMENTS

| | | | |
|---|---|---|---|
| 3,819,096 A | 6/1974 | Pyper | |
| 4,183,619 A | 1/1980 | Makuch | |
| 4,216,004 A | 8/1980 | Brehm et al. | |
| 4,322,025 A | 3/1982 | Johnson | |
| 4,502,620 A | 3/1985 | Leiby | |
| 4,503,744 A | 3/1985 | Garner et al. | |
| 4,552,290 A | 11/1985 | Szostak | |
| 4,896,649 A | 1/1990 | Rabenecker | |
| 4,948,222 A | 8/1990 | Corke et al. | |
| 5,129,567 A | 7/1992 | Suda et al. | |
| 5,188,268 A | 2/1993 | Hakoun et al. | |
| 5,213,244 A | 5/1993 | Curtis et al. | |
| 5,368,211 A | 11/1994 | Michel et al. | |

(Continued)

FOREIGN PATENT DOCUMENTS

| | | |
|---|---|---|
| EP | 0295374 A2 | 12/1988 |
| WO | 9854608 A1 | 12/1998 |
| WO | 0041013 A1 | 7/2000 |

OTHER PUBLICATIONS

European Examination Report for Application No. 06 779 533.6, dated Feb. 3, 2011, 10 pages.

*Primary Examiner* — Christopher M Koehler
(74) *Attorney, Agent, or Firm* — Brooks Kushman P.C.

(57) ABSTRACT

A method for cleaving one or more optical fiber(s) at an angle to the optic axis is provided and includes clamping the optical fiber(s) with its coating stripped to expose its distal end. An axial force and/or a bending force is applied to the optical fiber to create internal stresses in the fiber. A sharp blade is provided in an orientation such the blade edge is perpendicular to the optical fiber. The blade is further orientated such that a plane bisecting the blade angle formed between two polished surfaces of the blade is slanted relative to the longitudinal axis of the fiber. The at least one optical fiber is scratched with the sharp blade to create a non-perpendicular cleave having a controlled shape in the region of the scratch. A method of splicing the fibers and a tool for cleaving the fibers are also provided.

21 Claims, 18 Drawing Sheets

(56) References Cited

U.S. PATENT DOCUMENTS

| | | |
|---|---|---|
| 5,382,276 A | 1/1995 | Hakoun et al. |
| 5,829,659 A | 11/1998 | Mansfield et al. |
| 5,838,850 A | 11/1998 | Mansfield et al. |
| 5,839,635 A | 11/1998 | Mansfield et al. |
| 6,578,747 B2 | 6/2003 | Murgatroyd |
| 7,605,045 B2 | 10/2009 | Peidous et al. |
| 8,069,691 B2 | 12/2011 | Murgatroyd |
| 8,104,974 B1 | 1/2012 | Gurreri |

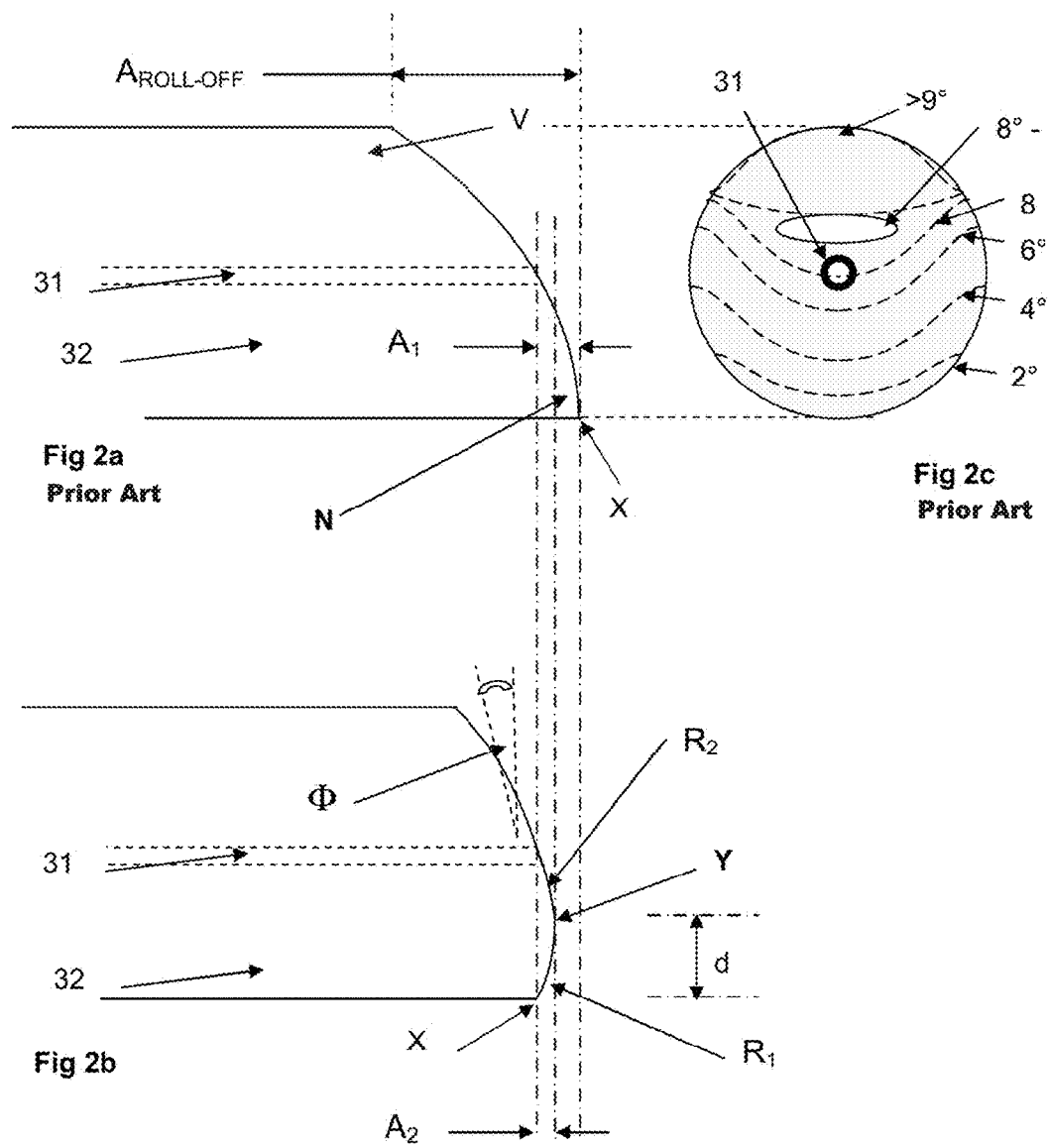

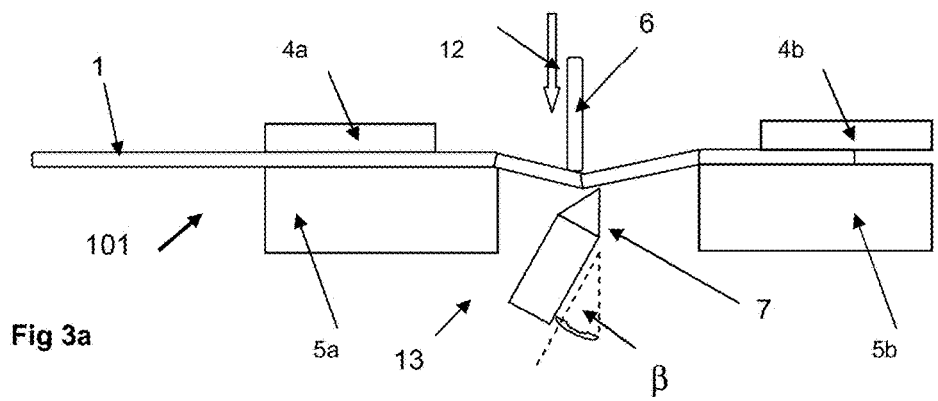
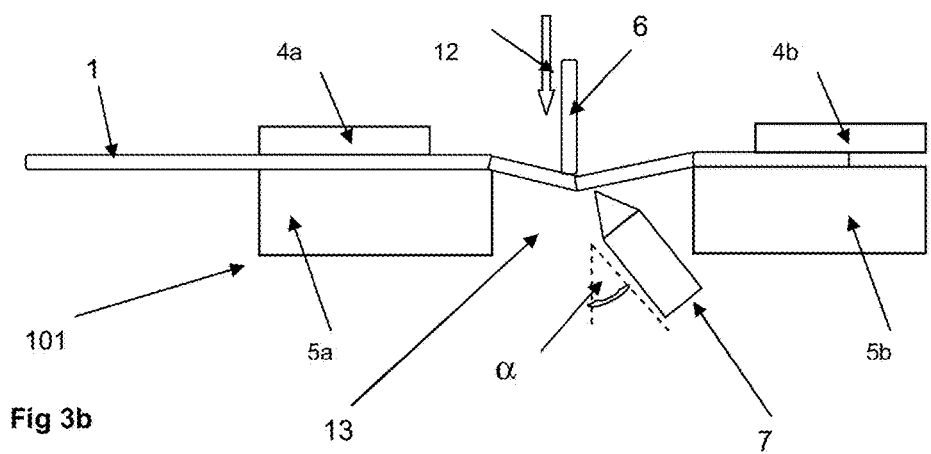
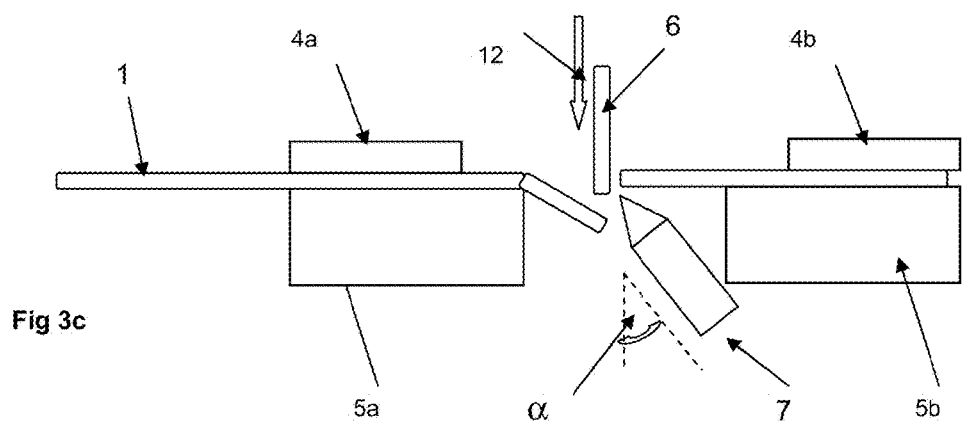

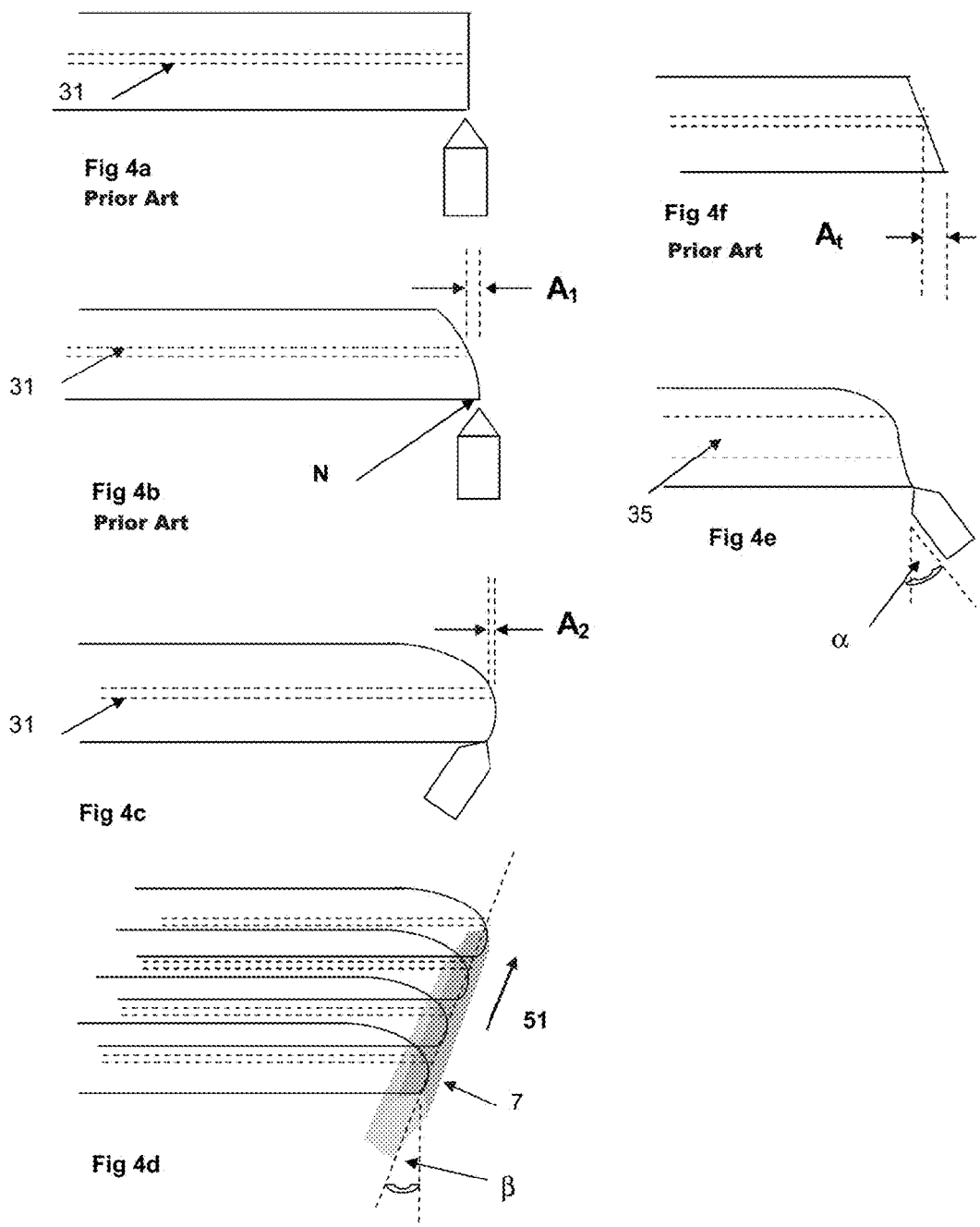

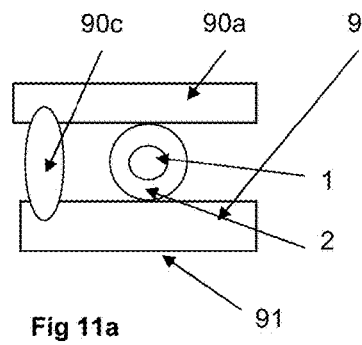
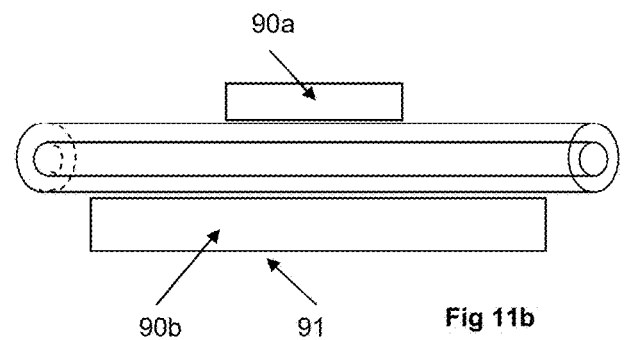
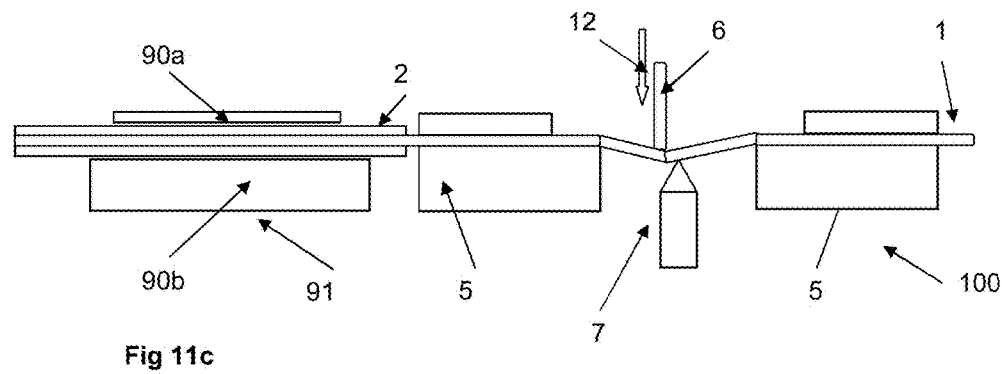
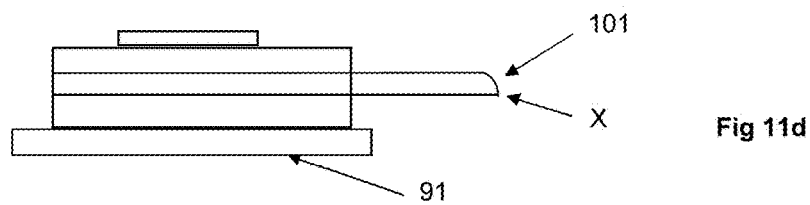
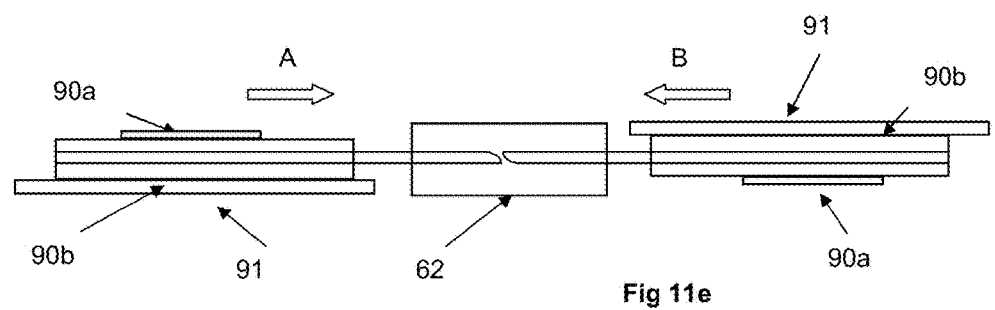

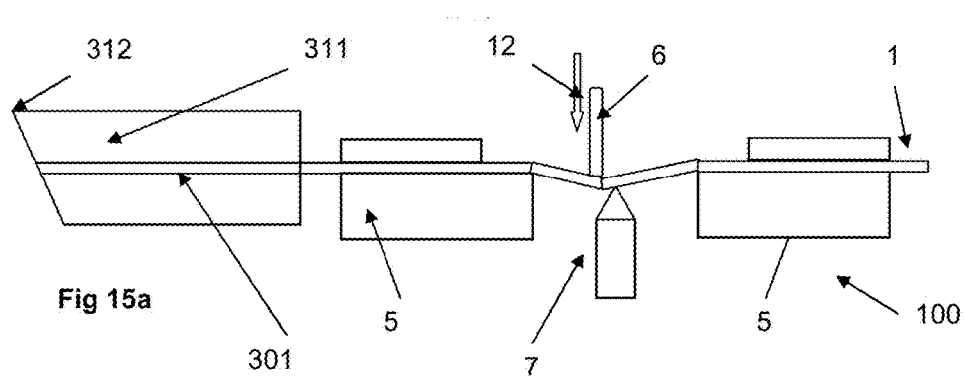
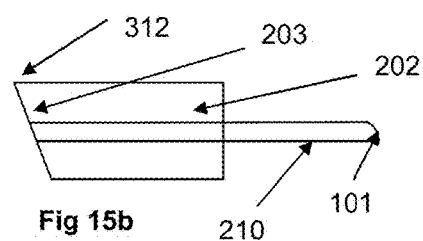
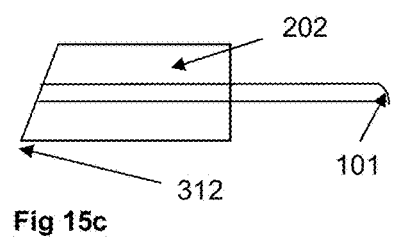
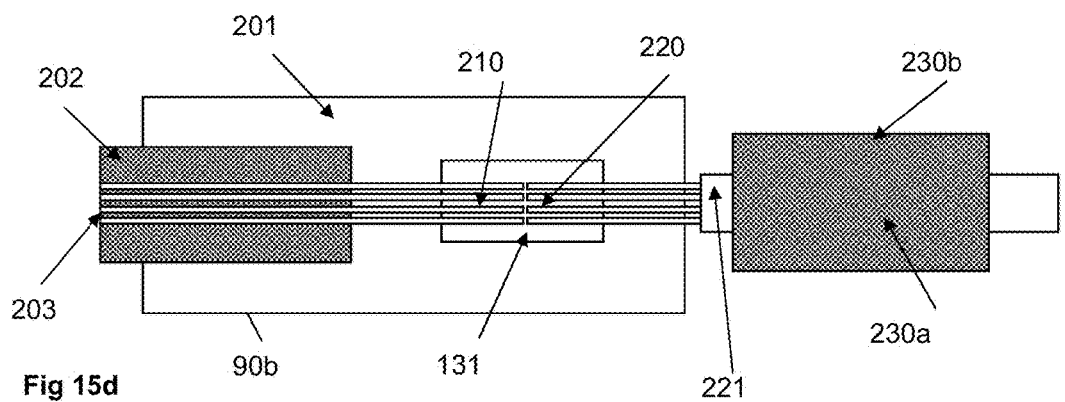
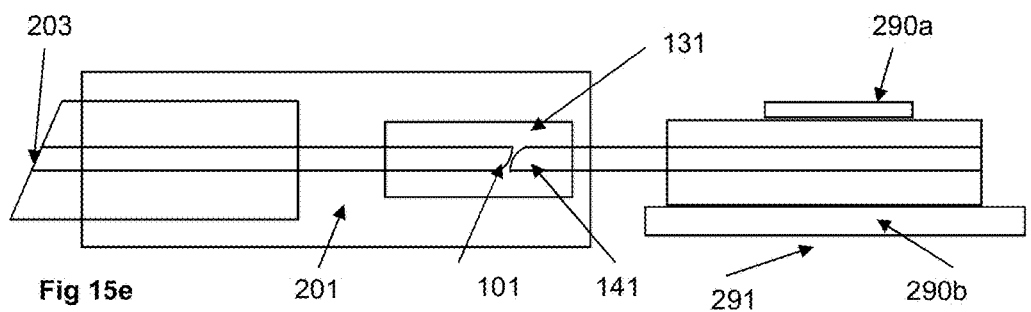

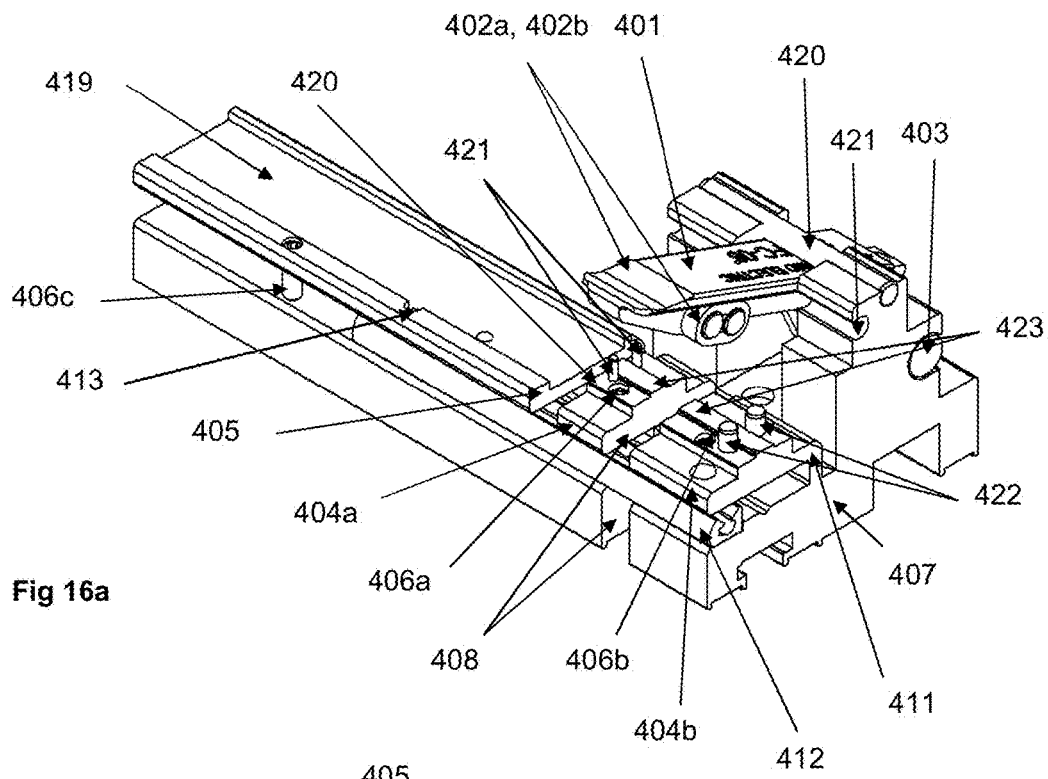
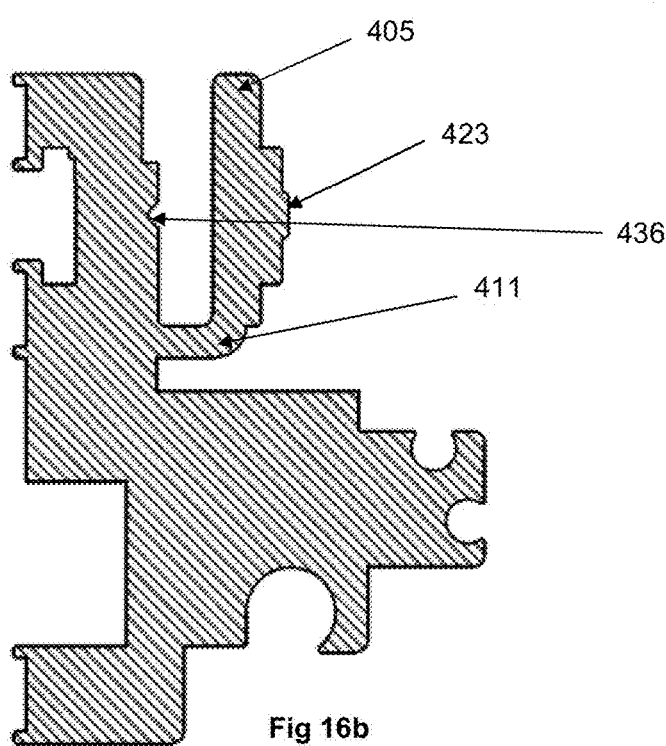

PROFILING OF CLEAVED ANGLED END FACES OF OPTICAL FIBER(S)

CROSS-REFERENCE TO RELATED APPLICATIONS

This application claims priority to GB Application Number 1205917.6 filed on 2 Apr. 2012, GB Application Number 1216745.8 filed on 19 Sep. 2012 and GB Application Number 1304344.3 filed on 11 Mar. 2013, the disclosures of which are incorporated in their entirety by reference herein.

TECHNICAL FIELD

The present invention relates to methods and apparatus for cleaving an optical fiber or fibers, one major purpose of which is that two or more fiber ends may be joined together in the form of an optical splice for the purpose of interconnecting two or more optical fibers. The invention also relates to mechanical joining of a cleaved fiber end face and an optical connector.

BACKGROUND

Transmission of data using optical fiber is a well known and advantageous method of communication. Optical fibers are generally made of silica glass containing a central core in which the light travels.

Each fiber requires proper termination so that joints can be made, for example, where 2 fibers are spliced together or where optical transmitters, detectors or connectors require attachment to the fiber. Proper termination requires that an end surface of the core of the fiber is left substantially mirror smooth, at a predetermined angle to the axial centre of the fiber.

Construction of the optical splice requires that the core of the optical fibers should be brought closely together so that light travelling in one fiber is required to traverse as small a gap as possible to enter in to the mating fiber, the gap being small so that there is little opportunity for the light to spread out in the intervening gap and consequently as much light as possible is injected in to the mating fiber—in other words to minimize the Insertion Loss of the optical splice.

The use of perpendicularly terminated cleaved end faces ensures the closest possible approach between the two fiber ends so that light travelling in one fiber or fiber array can traverse in to the second fiber or fiber array with substantially no loss arising from the light spreading out in the intervening gap. The perpendicularly terminated end can be prepared by polishing, mechanical or laser cleaving or otherwise. However, a substantial fraction of up to 4% of the incident light is back-reflected from a mirror-smooth end face and if the end face is perpendicular, this reflected light is deleteriously transmitted back down the fiber, creating optical noise and feedback. The gap between the two fiber ends may be filled with index matching gel but this is only effective in suppressing reflections over a limited temperature range. It has therefore become industry standard practice to angle the fiber ends to ensure that any reflection is not transmitted down the optical fiber; an 8° angling away from the perpendicular reduces the transmitted back-reflection from −14 dB to −60 dB. This elimination of optical noise from the transmission system is of great advantage when pigtailing optical fibers to photonic components or when mechanically splicing two lengths of fiber together.

Cleaving tools to create a cleaved fiber end are well known in the art, such as disclosed in EP 295,374 B and manufactured by Fujikura KK of Japan, and work by a combination of clamping, scratching and bending the optical fiber and produce a substantially perpendicular cleave. A side view of a perpendicular cleaved end is shown in FIG. 4a. To achieve an angle cleaved end, the fiber may be twisted prior to cleaving, as in tools manufactured by PK Technologies, USA or by Ilsin Technologies, South Korea. The resultant cleaved end face arising from such twist-to-angled-cleaves techniques have a "nose" of glass projecting beyond the core of the fiber, as shown in FIG. 4f, and this hinders close approach of the cores of two fibers when they are joined together in a mechanical splice as it defines a minimum distance therebetween; FIG. 6e shows two such fibers joined together in a splice in an orientation in which the separation (2×A t) of the two cores is a maximum.

Angled cleaves may also be created by bending a tensioned fiber or fibers to create internal shear stresses. This technique has the advantage that the cleaved end face is smooth without the roughness associated from ripping. The end angle achieved is set by the magnitude of the deflection of the fiber between two known points and so the end angle achieved is very repeatable. Importantly, such bend-to-angle-cleave techniques have a very much reduced "nose" of glass, N, projecting beyond the core of the fiber, in which the core of the fiber is angled but the portion of the cleaved end face close to the scratch created by the blade substantially perpendicular to the optic axis of the fiber (see FIG. 2a and FIG. 4b). Such an angled cleaved end with a reduced "nose" can more closely approach the waveguides in a "pig-tailed" opto-electronic component such as a laser diode or a waveguide because of the reduced glass projection. There are a multitude of opto-electronic devices such as laser diodes, optical detectors, planar light-guides or other, with which an optical fiber interfaces so that the light can enter or exit the opto-electronic component. The core of the optical fiber should approach closely, or abut, the waveguides within the component. Increased separation of the core of the fiber and the component gives a significant insertion loss as the light spreads out as it travels unguided in the intervening air gap. In many cases, there is also an advantage to angling the cleaved fiber end to prevent optical reflections travelling in the opto-electronic component or optical fiber. Therefore, it is advantageous if the fiber end is angle cleaved with a reduced glass projection.

U.S. Pat. No. 6,578,747, in the name of Murgatroyd, shows, at FIG. 4a, the result of angle cleaving an optical fiber or fibers by shearing tensioned fiber or fibers between two sharp corners. The core of the fiber is angled but the region of the fiber close to the cleave-initiation scratch is substantially perpendicular to the optic axis of the fiber, giving a reduced glass projection beyond the core of the fiber. If such angle ends are used in optical splices, the core of the fiber can closely approach a second optical fiber because of the reduced glass projection.

In contrast, angling the ends of one or both fiber or fibers or array of fibers will prevent close approach between the cores of the optical fibers constituting the optical splice owing to the mechanical shape of the "nose" of the cleaved fiber end, as shown in FIG. 6e. This separation of cores can lead to insertion losses of 3 dB or more, even when the intervening gap is filled with index matching gel, 90. Of course, close approach of the cores of the fibers can be achieved by ensuring that the two angled fiber ends are oriented so that their angled ends are mated, so substantially reducing the core separation and so minimising the insertion loss, but this requires control of the orientation of both fibers. Such requirement of control of the fiber orientation is expensive and difficult to achieve.

Recent developments by Gurreri (U.S. Pat. No. 8,104, 974) have shown that this close control of orientation of the angled fiber ends can be eliminated if the angled fiber ends are angled but not planar. The core of the fiber is arranged so that it is angled at 1°-30° away from the perpendicular, and preferably 4°-12° and most preferably close to 8° from the perpendicular and this suppresses the back-reflection to −60 dB or less. The "nose" normally expected from a planar angled end is missing and so the cores can closely approach each other to reduce insertion loss and so the cores of the fibers can approach each other closely, whatever the rotational orientation of either fiber.

It can be seen that close approach of the angle cleaved fiber end to the optical fiber or opto-electronic component is widely beneficial and this can be achieved by angle cleaving by shearing the fiber.

Optical fiber splicing is often carried out in the field and so one or both of the optical fibers must be terminated in the field. This field termination is conventionally carried out by mechanical cleaving and so non-planar, angled ends faces which offer low back-reflection and low insertion loss are only useful if they can easily be created in the field, and therefore, preferably, they should be created by mechanical cleaving.

Murgatroyd (U.S. Pat. No. 6,576,747) reveals (e.g. FIG. 1a and FIG. 1b) a technique for angle cleaving optical fiber or fibers by clamping the fiber, bending it between an anvil and a closely spaced-apart edge and scratching the fiber with a sharp blade. Murgatroyd (U.S. Pat. No. 8,069,691) reveals (e.g. FIG. 3b and FIG. 3c) a tool and method for creating bend-to-angle-cleaves by conveniently arranging the clamping surfaces, compliant clamping surfaces, anvil and blade around a common pivot. Similarly U.S. Pat. No. 7,605,045 creates shear stresses using an angularly-movable ("rotatable") fiber-deflecting member, preferably a rotatable double anvil, which can be widely separated (preferably by more than 1 cm, more preferably at least 2 cm) from each of the fiber clamping members. In these cases, the shape of the angle cleaved end is shown in accompanying FIG. 2a and FIG. 4b and is characterized by an angled fiber in the region of the core and a section of the cleaved end face which is substantially perpendicular to the optic axis close to the initiation scratch X.

Referring to FIG. 2a, the region, V, of the angle cleaved end far from the scratch X which initiates the cleave is seen to be at a large angle from the perpendicular with a characteristic distance AROLL-OFF. It is desirable that this distance is preferably less than 30 µm for a 125 micron diameter single-mode fiber and always less than 50 µm. If AROLL-OFF is too large, angle cleaved fibers may not splice together because the absence of glass may effect the seating of the cleaved fiber in a splice and so lead to excess insertion loss. Generally, AROLL-OFF is decreased if greater tension is present in the fiber.

An equi-angular plot of the cleaved end face is shown in FIG. 2c. The maximum protrusion of the glass beyond the core of the fiber is seen to be a distance of A1 in FIG. 2a, with a value of approximately 3 µm. When an optical splice is created by butting together two such angle cleaved ends in a V-groove 3 (see FIG. 6d), the separation of the core can be as large as 2×A1, i.e. about 6 µm, as shown in FIG. 6a. When the gap between the optical fiber is filled with index-matching gel, the insertion loss is approximately 1 dB or less and this is effective in producing a field-installable optical splice with low back-reflection and insertion loss of less than 1 dB. With such angle-to-bend angled cleaved ends, it is therefore less important to control the relative orientation of the angle cleaved ends.

In contrast, if a substantially planar angled cleave is used, as is formed from twisting the fiber prior to cleaving, the gap between the cores can be substantially larger and so the insertion loss is unacceptably high. FIG. 4f shows the shape of the angled end arising from twisting if two such angled ends are brought together in an optical splice in the worst rotational orientation, the gap between the cores can be as large as 2×A t, as shown in FIG. 6f, i.e. 2×(fiber diameter)/ 2*tan(8°) which is approximately 20 µm. It would be necessary to control the orientation of the angled fibers to reduce this gap if a low insertion loss optical splice were to be made.

The internal stress required to create an angled cleave over the core can be created by bending the fiber as described in U.S. Pat. Nos. 6,578,747, 7,605,045 and 8,069, 691. However, it should be understood that the fiber is also significantly stressed by the force required for the diamond to cut in to the glass to the depth of 2-3 µm required to produce the cleave-initiation crack. U.S. Pat. Nos. 6,578, 747, 7,605,045 and 8,069,691 all use a diamond blade acting perpendicular to the fiber axis to scratch the stressed optical fiber to initiate a cleave. The cutting force is therefore directed perpendicular to the optic axis of the fiber and so the initial part of the cleave starting from the starter crack (see FIG. 2a), will be substantially perpendicular to the optic axis. In portions of the cleave away from the starter crack, the shearing forces arising from the bend in the fiber encourage the cleaved end face to be angled with respect to the optic axis of the fiber.

SUMMARY

According to a first aspect of the present invention there is provided a cleaving technique for cleaving one or more optical fiber at an angle to the optic axis in which the blade is introduced at an angle slanted away from the normal to the axis of the fiber or fibers, as shown in FIG. 3a. The method comprises clamping said at least one optical fiber, with its coating stripped to expose the glass distal end of the one or more fiber; providing a sharp blade orientated such the blade edge is perpendicular to the optical fiber, and such that a plane bisecting the blade angle formed between the two polished surfaces of the blade is slanted at an angle in the range of 18° to 45° relative to the longitudinal axis of said glass fiber; and scratching said at least one optical fiber with said sharp blade to create a non-perpendicular cleave having a controlled shape in the region of the scratch.

The method may further comprise applying one or more of an axial force and a bending force to the at least one optical fiber so as to create internal stresses therein.

A clamping force may be applied to the at least one optical fiber and application of the clamping force can apply a longitudinal axial force to the fiber. Application of the clamping force may comprise progressively clamping the at least one fiber simultaneously in two places against oppositely angled surfaces such that the fiber is initially clamped at an outermost part of the clamps, and the clamping force progresses from the outermost part of the clamps to an innermost part of the clamp so as to applying a longitudinal axial force to the fiber as it is stretched against said two oppositely angled surfaces.

The cutting force will tend to stress the fiber at an angle to its axis and so the first part of the resultant cleave, within a distance d from the starter crack (see FIG. 2b), will be away from the perpendicular to the fiber's axis. However, away from the starter crack, particularly in the region of the singlemode core, 2, 31, the end face will be angled due to the bend in the fiber. Thus, the force arising from the blade's cutting action and the internal stress created by bending the fiber act largely independently, allowing greater control of the shape of the cleaved end face. The direction of angling of the resultant cleaved end face arising from these two different mechanisms may be in opposite directions (FIG. 3a) or in the same direction (FIG. 3b).

The slanting of the blade is such that the direction 51 of the edge of the blade is perpendicular to the optic axis of the fiber(s) as well as the blade acting at an angle β to the perpendicular to the fiber The direction of the slanting of the blade allows it to angle cleave an array of fibers, as shown in FIG. 4d. The slanting of the blade is such that it is at substantially the same distance from all of the fibers in the array. On operation of the tool the blade will cut all of the fibers at substantially the same time.

It should be noted that a slanted or angled blade can be used to create an angled end face even if the fiber is not sheared, as shown in FIG. 7b. FIG. 7a shows a mechanism in which the fiber or fibers are clamped at two points, tensioned and symmetrically bent by a 2-armed anvil and scratched with a perpendicular-acting blade. The dimensions of the parts can be arranged to give a near perpendicular cleave. If the same mechanism is used, except using a slanted blade (see FIG. 7b), the end angle will be non-perpendicular, i.e. it will be angled.

The techniques for clamping and cleaving fiber or fibers according to the present invention produce the desired effects of an angle cleaved end face which does not have a pronounced "nose" or glass projection and thereby allows a close approach of the cores of the two fiber end faces and produce a cleaved fiber end or ends which may be used for splicing or terminating optical fiber or fibers in the field or elsewhere.

Specifically this invention is concerned with slanting the angle of the sharp blade which is used to scratch the fiber or fibers, in addition to stressing the fiber(s) by bending, so that the internal stresses are controlled to produce a cleaved end face(s) at a predetermined angle with a predetermined shape.

The fiber or fibers are clamped and stressed by a combination of deflecting and tensioning the fiber(s) to induce a controlled internal stress in the fiber or fibers. Scratching the fiber(s) with the sharp blade provided at an angle to the fiber(s) introduces a further internal stress into the fiber. The subsequent cleave is determined by the superposition of all of the internal stresses in the fiber and the control of these stresses gives a cleave with the required characteristics.

The blade, which may be a polished diamond, metal or other hard, sharp edge, is pressed in to the outer skin of the fiber to scratch the glass to a critical depth of 2-3 μm at which point the crack is propagated as a cleave across the fiber.

The blade of the present invention is mounted so that it is slanted by an angle β compared to a plane perpendicular to the optical fiber or fibers. The angle β may preferably bi in the range 20° to 40°, and most preferably 25° to 35°. As described herein below these angles achieve the required result of reducing the protrusion of the nose thereby allowing ends to be closer coupled or spliced, thereby reducing insertion losses.

It is also understood that the blade can be mounted at an angle α with respect to multiple fibers. α may be of the same magnitude as β but is oriented in the opposite direction All fibers will be cleaved with a large portion of the cleaved end face angled and this can be important when reducing back-reflection for many multi-mode fibers.

When the angle α is used the plane bisecting the blade angle is slanted towards the distal end of the at least one optical fiber such that the angle cleaved fiber end has a reduced glass protrusion beyond the core of the fiber. This may be particularly advantageous for cleaving at least one single-mode fiber.

When the angle α is used the plane bisecting the blade angle is slanted away from distal end of the at least one optical fiber such that the angle cleaved fiber end has a large proportion of the cleaved end face which is angled. This may be particularly advantageous for cleaving at least one multimode fiber.

The angling of the blade's mounting is also important in determining the movement of the fiber after it has cleaved. To create an angled cleave, the fiber is bent by the anvil and after cleaving the fiber tends to straighten out. If the blade is mounted normal to the fiber, as shown in FIG. 1b, this is likely to cause the cleaved fiber end to hit the blade, causing damage or dirt where the cleaved fiber end touches the blade, which is likely to be deleterious to the performance of the subsequent cleaved fiber end. However, if the blade is mounted at an angle α greater than the angle of the polished surface of the blade, the cleaved fiber end cannot come in to contact with the blade after cleaving and so the danger of damage to the fiber end is averted, as shown in FIG. 3c. Typically, the blade is polished with an included angle of about 60°, with a half angle of 30°, so if α>30°, there will be no contact between the cleaved fiber and the blade. Therefore the plane bisecting the blade angle slanted at an angle to the plane perpendicular to the longitudinal axis of the fiber may be equal to, or greater than, half of the blade angle.

It is an advantage of the present invention that a slanted blade can serve to create an angled cleave even when the fiber is stressed substantially axially, as is used for producing perpendicular cleaves.

If a blade acts normally to a substantially axial direction a perpendicular cleave results, as shown in FIG. 7a where the fiber is clamped at 4a, 5a and 4b, 5b and deflected by a two-armed anvil 6a, 6b. When the blade is angled away from the normal, it will generate a non-axial component to the internal stresses which will give a cleave which is angled away from the perpendicular. For a 60°-included-angle polished diamond blade, when the blade acts at an angle β of 20° away from the normal (see FIG. 2b), an end angle across the core of approximately 1°-2° away from perpendicular is obtained. When the blade acts at larger angles away from the normal, the cleaved end face is at a greater angle from the perpendicular.

According to a second aspect of the invention there is provided a method of joining two optical fibers, or two optical fiber ribbons, the method comprising: cleaving the ends of a first and a second optical fiber, or optical fiber ribbons, according to the first aspect of the invention, and joining the two cleaved ends in an optical splice. This aspect of this invention is described with reference to FIG. 10a below. One or both optical fibers is cleaved with an angled end face using a blade slanted at angle β so that the protrusion of the glass beyond the core of the fiber is reduced, i.e. it is produced by the method of the first aspect of the invention. The end of the other optical fiber may be similarly angle cleaved or may be perpendicularly cleaved and an index-matching gel may be applied between the two cleaved fiber ends. The optical fibers are secured within the housing to create a robust optical splice. Because of the reduced protrusion of glass arising from the use of the slanted blade when cleaving the fiber, the orientation of the glass fibers relative to each other may be uncontrolled and yet still give a low insertion loss. The other ends of either or both glass fibers may be attached to an optical system, such as a fiber optic network, or may be terminated in a connector such as e. a pre-polished APC/FC connector or any other terminal.

The method may include orientating one of said first and second optical fibers or optical fiber ribbons such that its cleave is inverted relative to the cleave of the other of said first and second optical fibers or optical fiber ribbons.

According to a third aspect of the invention there is provided a method of joining an optical fiber, or an optical fiber ribbon, to an optical connector, the method comprising cleaving the end of at least one optical fiber or optical fiber ribbon according to the first aspect of the invention, and joining the cleaved end to an optical connector. The fibers may be placed in a fiber holder or other means of retaining the fiber which are commonly used in the industry. A fiber or fibers are secured in a fiber holder and then placed in the fiber cleaving tool to obtain an angled cleave or cleaves. As a consequence, the angled cleave(s) so created have a specific orientation in relation to the fiber holder. Provided that the fiber(s) are kept in the fiber holder, the orientation of the angled ends is therefore well know and can be arranged in an optical splice along with a second fiber or fibers or single- or multi-fiber connector such that the cleaved ends are oriented in specific relation to one another.

The method may comprise orientating the cleaved end the optical fiber or optical fiber ribbon with said optical fiber stub of the connector such that the angles of the two cleaved ends are inverted relative to one another in opposite alignment so as to minimise the separation thereof.

When single fiber is angle cleaved and mated with a second similar angled cleaved fiber, both fibers may be contained within fiber holders and the fiber holders are pushed together. The two angled cleaves are located within a V-groove of an optical splice. By adjusting the relative rotation of the fibers by inverting the fiber or fiber holder, the two angle cleaved fiber ends will be in-phase and so there will be a minimal gap between the fiber cores. Alternatively the two fibers in their holders can be pushed together to form a splice and without controlling the relative orientation of the two holders and fibers because the shape of the angled cleave gives a low insertion loss splice.

The method of the second or third aspect of the invention may further comprise placing the optical fiber or optical fiber ribbon in a fiber holder provided with orientation identifier on at least one side thereof, and wherein orientating said optical fiber or said optical fiber ribbon comprises using said orientation identifier to orientate said fiber holder. Thereby easy identification of the correct orientation of the fibers to ensure minimum insertion loss is achieved.

Similarly, a connector with an internal angle cleave has a specific orientation compared to a reference flat on the connector and so an angle cleaved fiber can be spliced to this internal fiber stub with a known orientation between the two angle cleaved ends. The use of a slanted angled blade of the present invention reduces or removes the need for a specific relative orientation of the two angle cleaved fibers.

It will be appreciated that low insertion loss connections can also be obtained between the angle cleaved internal fiber stubs of a pre-polished multi-fiber connector and an angle cleaved multi-fiber ribbon, as can low loss splices between two multi-fiber ribbons. These are both achieved by ensuring that the faces of the two fiber ribbons are in-phase by control of the relative orientation of the fiber holders and/or the multi-fiber connector body.

According to a fourth aspect of the invention the invention there is also provided a tool for cleaving a fiber by the method hereinabove described. In the apparatus the angle of the blade of the tool may be set at an angle $\beta$, as described above with respect to the axis of the fiber, however the tool itself may be used with known perpendicular blades.

The fourth aspect of the invention provides an optical fiber cleaving tool, comprising: a unitary chassis comprising a base section, a cutting table attached to the base section via a deformable section, the cutting table having a fiber axis along which, in use, a fiber is aligned for cleaving, and a clamp mount; a blade assembly attached to said base section; one or more adjusters configured to adjust the height of the cutting table relative to the base section by deforming the deformable section so as to control the separation of the cutting table from the blade section; and a clamp arm having two first clamping surfaces and an anvil section, the clamp arm rotateably mounted to the clamp mount. The cutting table comprises first and second sections, each having a second clamping surface thereon, separated by a cutting hole. The blade assembly is mounted so that it extends into the cutting hole. Rotation of the clamp arm moves the first clamp surfaces to bear on the second clamp surfaces and the anvil to extend into the cutting hole. The anvil may be located on the clamp arm such that upon rotation of the clamp arm it extends into the cutting hole at a position offset from the blade assembly.

The fiber axis is preferably substantially perpendicular to the cutting arm and the blade assembly is orientated such that the blade edge is substantially perpendicular to the fiber axis, and such that a plane bisecting the blade angle is slanted at an angle of 18 to 45 degrees relative to a plane perpendicular to said fiber axis. Optionally the blade angle may be provided at an angle of 20-40 degrees, or at an angle of 25-35 degrees, relative to said plane perpendicular to said line taken between the two clamping positions.

The first and second clamping surfaces may be configured to, in use, apply a longitudinal stress to at least one fiber clamped therebetween. Preferably the second clamping surfaces are each angled in an orientation such that, in the unclamped position they slope in opposite directions to one another away from the second clamping surfaces such that they are closest to the second clamping surface at their furthest separation and are furthest from the second clamping surface at their closest separation, and as the second clamping surface moves towards the first clamping surface a progressive clamping force is provided from the clamps furthest separation to the clamps closest separation. The first clamping surfaces are preferably resilient in nature such contact between the first clamping surfaces and the second clamping surfaces does not prevent further movement of the clamp arm. The resilient deformation of the first clamping surfaces can enables continued movement of the cam arm to move the anvil into closer proximity to the blade assembly.

In one embodiment the cutting edge of the blade may have a non-symmetrically polished edge such that a plane bisecting the blade angle formed between the polished edges is angled relative to the plane of a body section of the blade. In this manner the required angled cut can be provided without having to slant the whole of the blade, i.e. it is the angle of attack of the cutting face of the blade, i.e. the angle of the plane bisecting the cutting edge relative to the plane perpendicular to the fiber axis, that causes the required cleave shape.

The blade assembly can be is selectively rotatable relative to the cutting table about an axis parallel to the fiber axis to, in use, enable a different area of the blade edge to come into contact with the optical fiber. Optionally the blade assembly may comprise a single crystal diamond, oriented and polished on the {111} crystallographic faces, attached to a steel shank.

In one embodiment the plane bisecting the blade angle is slanted towards the distal end of the at least one fiber to, in use, create an angled cleave with reduced glass protrusion beyond the core of the at least one fiber. In an alternative embodiment the plane bisecting the blade angle is slanted away from the distal end of the fiber or fibers to, in use, create an angled cleave with reduced glass protrusion beyond the core of the at least one fiber.

The blade may be part of a blade assembly which is selectively rotatable about a pivot point to, in use, enable a different area of the blade edge to come into contact with the optical fiber. The blade assembly may comprises a single crystal diamond, oriented and polished on the {111} crystallographic faces, attached to a steel shank.

In all of these above applications, it is understood that a substantial cutting force is required to scratch the tensioned and bent optical fiber to initiate a cleave and this force also acts upon the diamond cutting blade. The depth of the starter crack required to initiate the cleave depends inversely on the tension in the fiber, therefore, if the tension in the fiber is too low, the diamond must penetrate further in to the fiber to initiate the cleave and this can lead to distortion of the fiber and hence a poor cleave and a damaged diamond blade. When the blade acts perpendicularly, this scratching force is symmetrically distributed on the diamond and so the starter crack is more likely to form cleanly. In contrast, a slanted blade will find it more difficult to penetrate the outside of the glass fiber and the fiber may slip over the blade rather than being scratched; this would lead to uncontrolled end angles and possible damage to the diamond blade. Therefore, to ensure that the diamond blade reliably penetrates the glass fiber to form a good starter crack, the tension in the fiber may be set higher that used for perpendicularly acting blades, despite generating undesirable roughness on the subsequent cleaved surface, to guard against variation in the tool operation leading to reduced tension in the fiber, poor cleaving, and a damaged blade. It is therefore desirable that the tool is designed so that the tension in the fiber can be accurately set with minimal variation in the tension set up in the fiber. It is therefore highly desirable that the cleave tool of the invention generates a reliable tension in the fiber and that this tension can be accurately set. This tool may be capable of cleaving one fiber or multiple fibers.

BRIEF DESCRIPTION OF THE DRAWINGS

The invention will now be described by way of example, with reference to the accompanying drawings, in which:

FIG. 2a shows the shape of the angled cleaved end obtained from bending and scratching the fiber with a perpendicular blade as known in the prior art;

FIG. 2b shows the shape of the angled cleaved end obtained from bending and scratching the fiber with a blade slanted at β° (see FIG. 3a) in accordance with the present invention;

FIG. 2c shows equi-angle lines on the cleaved end face for a perpendicular-acting blade, e.g. the cleave of FIG. 2a;

FIG. 3a shows an optical fiber being angle cleaved in accordance with the present invention in which the blade acts at a slanted angle β to the normal to the fiber to give an angled cleave with a small glass protrusion $A_2$;

FIG. 3b shows an optical fiber being angle cleaved in accordance with the present invention in which the blade acts at an angle α to the normal to the fiber to give an angle cleave with a larger fraction of the cleaved end face angled;

FIG. 3c shows the angle cleaved fiber end of FIG. 3b straightening out after cleaving, avoiding the blade and so ensuring a damage-free fiber end and a larger angled region close to the core;

FIG. 4a shows a perpendicularly cleaved fiber end as known from the prior art with the dashed lines indicating the position of the single mode core;

FIG. 4b shows an angle cleaved end arising from a perpendicular-acting blade with a small protrusion of the cleaved end, $A_1$, beyond the core of the single mode fiber as known from the prior art;

FIG. 4c shows an angle cleaved end arising from shearing the fiber using a blade which is slanted at an angle β to the perpendicular in accordance with the present invention, showing a reduction in the protrusion of the cleaved end beyond the core of the single mode fiber, $A_2$, compared to protrusion $A_1$ shown in FIG. 4b;

FIG. 4d shows the blade slanted at β° cleaving an array of fibers;

FIG. 4e shows an angle cleaved end arising from shearing the fiber using a blade which is slanted at an angle α to the perpendicular in accordance with the invention;

FIG. 4f shows an angle cleaved end arising from twisting the fiber as known from the prior art, showing a large the protrusion, $A_t$, of the cleaved end beyond the core of the single mode fiber;

FIGS. 11a and 11b show orthogonal views of a coated optical fiber in a fiber holder;

FIG. 11c shows the fiber held in a holder being angle cleaved for splicing in accordance with one aspect of the invention;

FIG. 11d shows the orientation of the angled cleaved end arising from angle cleaving;

FIG. 11e shows an optical splice made from 2 optical fibers, each held in a fiber holder with in-phase matching of the angled cleaved ends in accordance with one aspect of the invention;

FIG. 12b shows the orientation of the angled end arising from the vertical cleaving of FIG. 12a;

FIG. 15a shows a multi-fiber ribbon with one end angle polished placed in the angled cleaver of the invention;

FIG. 15b shows the orientation of the angled cleaves of the multi-fiber ribbon where the pre-polished connector face is substantially parallel to the orientation of the angled cleaves;

FIG. 15c shows the orientation of the angled cleaves of the multi-fiber ribbon where the pre-polished connector face is not parallel to the orientation of the angled cleaves;

FIG. 15d shows a view of a splice made between the multi-fiber connector and the multiple fibers of a ribbon, both of which are angle cleaved with the ribbon fiber holder inverted to obtain in-phase matching of the angled fiber ends;

FIG. 15e shows a side view of FIG. 15d;

FIG. 16a shows a cleaving tool comprising a chassis 407 which is machined to leave tables 404a and 404b independently flexed around a thin tongue of metal 411 to independently adjust the height of the tables to make it possible to set their respective heights with respect to a diamond blade 430 which is attached to the chassis. The optical fiber(s) pass over the two tables 404a, 404b and the fiber(s) are clamped by rubber rings which are mounted on a swinging arm 401;

FIG. 16b shows the cross-section of the chassis which may be extruded;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
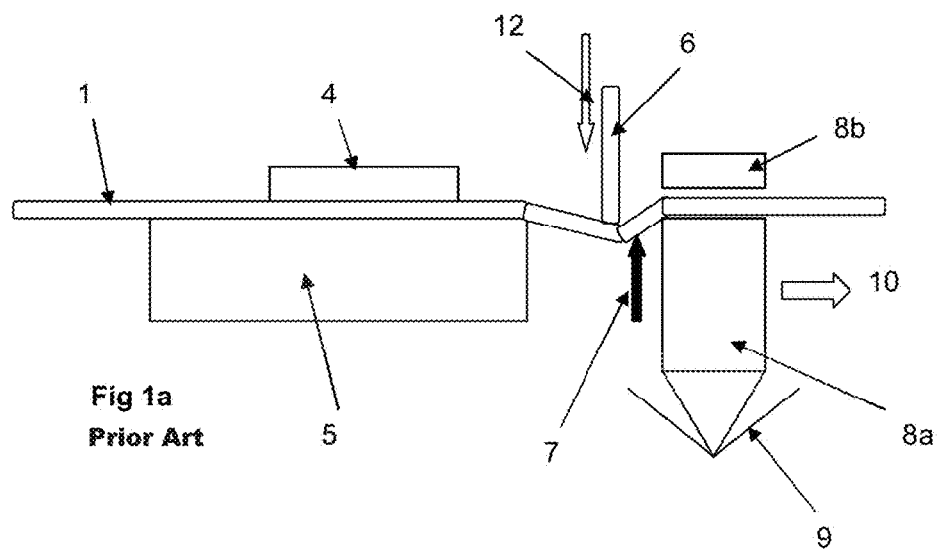
FIG. 1a shows an optical fiber, 1, being angle cleaved according to Murgatroyd, U.S. Pat. No. 6,578,747 in which the optical fiber is clamped, tensioned, bent and cleaved.
Figure 1B:
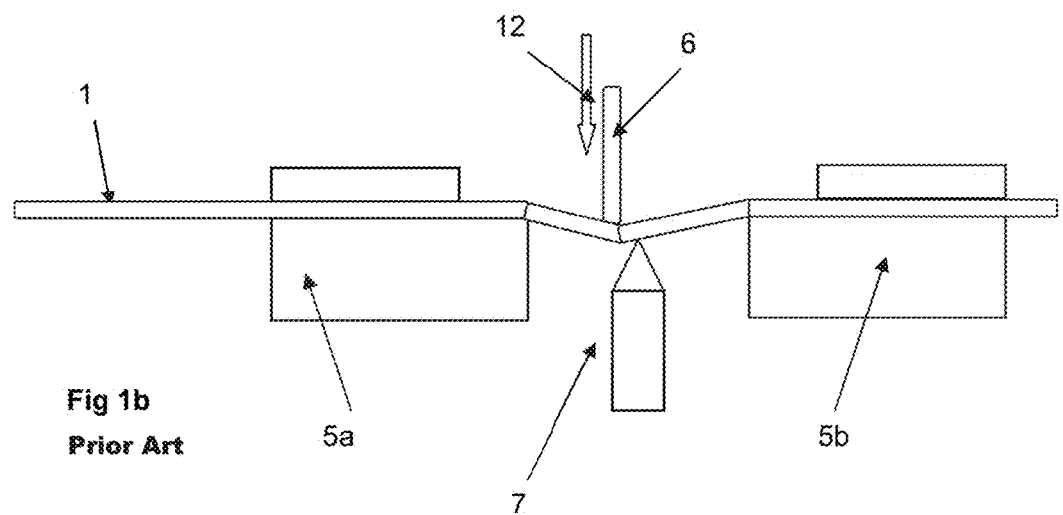
FIG. 1b shows an optical fiber being angle cleaved according to Murgatroyd, U.S. Pat. No. 8,069,691 in which the optical fiber is clamped, deflected and cleaved.

FIG. 1b shows a prior art example of an optical fiber 1 clamped at two points, 4a, 5a and 4b, 5b. Once the fiber has been clamped, it is deflected to a stop (not shown) by an anvil 6 moving in direction 12. When the stop has been reached, one or both of the clamps move downwards around a pivot (not shown) without changing the stresses on the fiber, so that the clamped and deflected fiber comes in to contact with a diamond blade 7. The blade is held upright and therefore acts in a direction substantially perpendicular to the longitudinal axis of the stressed fiber. The resultant cleave is angled with the centre of the fiber at a controlled angle away from the perpendicular, with the magnitude of the cleave angle given by the geometry of the bent fiber. FIG. 2a shows the shape of the cleaved end face obtained by using a perpendicularly-acting blade which gives a cleave which has a part close to the scratch X which is substantially perpendicular to the anvil. Deflection of the fiber is sufficient to produce an angled cleaved end as shown in FIG. 4f. The maximum protrusion of the glass beyond the core of the fiber has a value of A1 which is typically 3 µm.

FIG. 3a shows an optical fiber 1 clamped at two points 4a, 5a and 4b, 5b and deflected by the anvil 6. The stressed optical fiber comes in to contact with the diamond blade 7, causing the fiber to cleave with an angled end. However, the blade is angled away from the normal, by an angle β, and so the cutting stress serves to impart a cleave which initiates at an angle in the same direction as the angle of the blade's impact on the fiber in the region R1 close to the point where it is scratched, X in FIG. 2b. Away from the scratch, in region R2, the cleaved end face is angled in the opposite sense due to the internal stress imposed by the anvil's bending of the fiber. The resultant shape of the cleave is shown in FIG. 2b. It can be seen that in the region of the cleaved fiber close to the initiation scratch R1, caused by the angled blade, the fiber end is curved to the right, but further than a distance d from the scratch, the surface is curved in the opposite direction to the left; typically 10 microns <d<62.5 µm for a 125 micron diameter silica fiber. Consequently, the maximum projection A2 of the glass of the cleaved end face beyond the core of the fiber is at point Y at a distance d from the scratch, at which point, Y, the tangent to the cleaved surface is perpendicular to the fiber's optic axis. The value of A2 is typically 1-2 µm. It will be seen that the end surface of the core of the fiber, 31, is angled at an angle, Φ which is 1°-30° away from the perpendicular, and preferably 4°-12° and most preferably close to 8° in order to eliminate back-reflection. The glass cladding of the fiber is shown at 32.

When two such cleaved ends, with their glass projections, A2, are put together in an optical splice, the cores of the optical fiber approach each other closely, whatever their respective orientation. When the angled ends are oriented so that the angles mate together (FIG. 6c), the cores are nearly in contact with no gap therebetween. The gap between the two fibers may or may not be filled with index-matching gel 90. When the orientation of two such cleaved fibers are 180° out of phase (FIG. 6b), the maximum separation of the core of the optical fiber is 2*A$_2$ which is substantially reduced compared to a splice made with a perpendicularly acting blade often prior art which is 2*A$_1$ (FIG. 6a); again index-matching gel, 90, is present. Typically, for a blade mounted with β=25°, the maximum projection, A2, is reduced to about 1-2 µm, whereas the use of a perpendicular blade gives a maximum projection, A1, of approximately 3 µm. The consequential near halving in the maximum separation of the cores significantly reduces the insertion loss, making a splice made according to this invention highly desirable.

Figure 5:
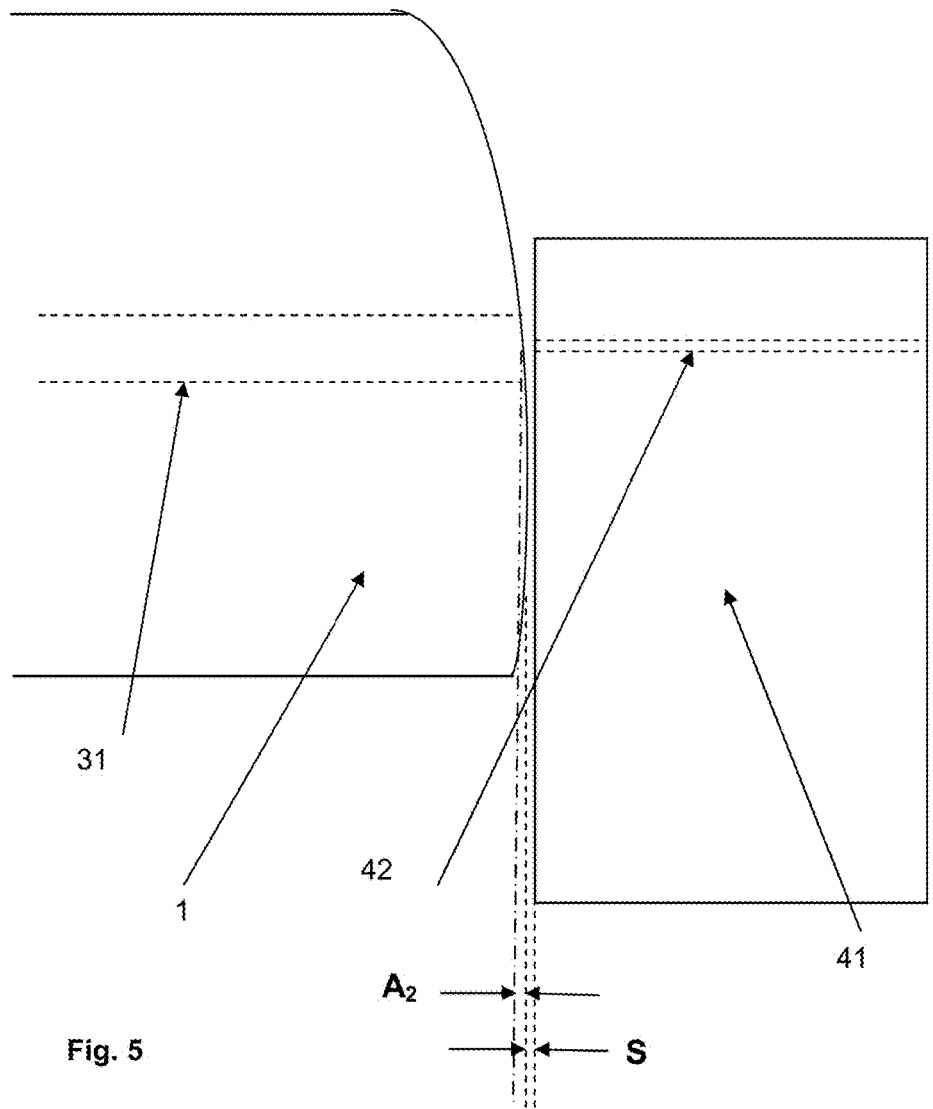
FIG. 5 shows a fiber angled cleaved in accordance with the present invention abutted to an opto-electronic device containing a waveguide.

In FIG. 5 we show the use of an angled cleaved fiber end with a reduced glass protrusion A2 abutted to the waveguide of an opto-electronic component; the angled end is required to reduce the back-reflection. When the separation S between the end of the optical fiber 1 and the edge of the opto-electronic component 41 is zero, i.e. the fiber is butted against the face of the optoelectronic component, the separation of the core 31 and the end of the waveguide 42 of the opto-electronic component 41 is as small as A2. Compared to a prior art angled optical fiber with a larger glass protrusion, e.g. arising from a twisted cleaved angled fiber or a bend-cleaved angled cleave using a perpendicularly acting blade, this reduced value of A2 limits the spread of the light between the core 31 of the optical fiber and the waveguide 42 of the opto-electronic component, so reducing insertion loss.

The method can also be used to cleave multiple optical fibers. The optical fibers are clamped at two points using compliant clamps to ensure that all the fibers are clamped and so all fibers are tensioned, see FIGS. 17a-17c and the description thereof. The fibers are deflected by the anvil 6. The stressed optical fibers come in to contact with the diamond blade 7, causing the fibers to cleave with angled ends arising from the internal shear created by the bending of the fibers. The blade is mounted so that it is slanted by an angle β compared to the perpendicular to multiple optical fibers arranged in a ribbon or otherwise and so the fibers in the ribbon will be angled cleaved with a reduced "nose" of protruding fiber with similar results as obtained with a single fiber, as shown in FIG. 4c.

FIG. 3b shows an optical fiber 1 clamped at two points 4a, 5a and 5a, 5b and deflected by the anvil 6. Again the stressed optical fiber comes in to contact with the diamond blade 7, causing the fiber to cleave with an angled end. However, the blade is angled away from the normal, by an angle α, and so the cutting stress serves to increase the angle of the cleave close to the point where it is scratched, with a resultant shape as shown in FIG. 4e. The cleaved end arising from such an angled blade will have a large portion of the cleaved end face angled and this can be important when reducing back-reflection from a fiber with a multi-mode core which is seen at 35. Consequently, the majority of light travelling in a multimode core will experience an end face which is angled, so reducing back-reflection. In contrast, an angled end arising from a perpendicular-acting blade FIG. 4b or a blade slanted at an angle β (FIG. 4c) will have a fraction of the multimode core close to the perpendicular, giving increased back-reflection.

Preferably an elastomeric clamp is used above and below the fiber for one or both clamping points 4a, 5a and 4b, 5b in order to reduce the damage arising from clamping the fiber. Similarly, the tip of the anvil 6 may be coated with a thin layer of a compliant material such as polyurethane or EPDM to reduce damage to the fiber during cleaving. In addition, any guiding mechanisms such as posts can be so coated to reduce damage.

Figure 8A:
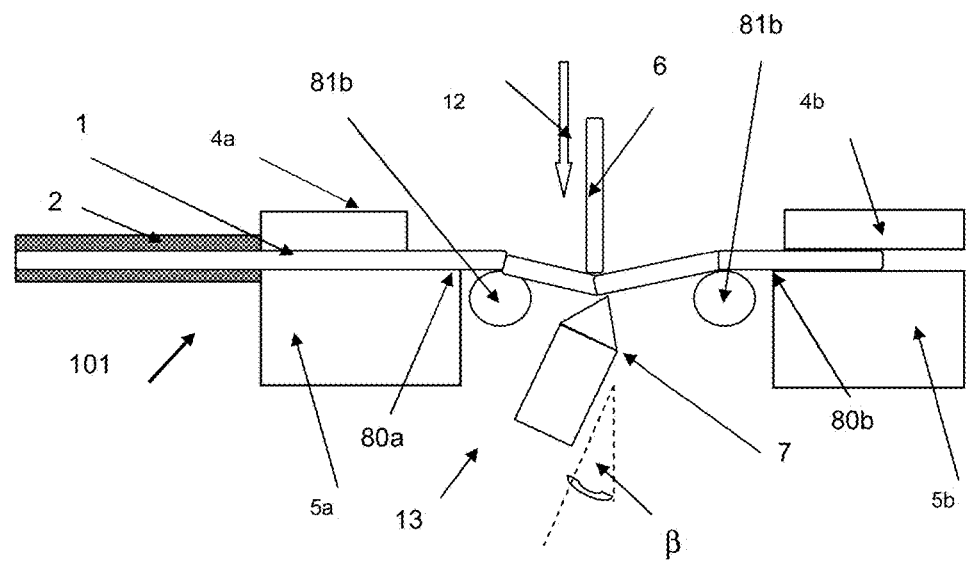
FIG. 8a shows a schematic representation of the cleaving tool which carries out the method of the invention.

Now referring to FIG. 8a of the drawings, an apparatus embodying this invention is shown in schematic representation of a cleaving apparatus made in accordance with the present invention achieving an angled cleave.

The cleaving apparatus 101 includes upper clamps 4a, 4b which respectively clamp the optical fiber 1 on to lower surfaces 5a, 5b, an anvil 6 and a blade 7. The lower clamping surfaces 5a, 5b may be the surface of a single plane 5 which is configured to move around a pivot or may be separate. The anvil may be attached to the same pivot and is applied to the stripped fiber 1 by moving it towards plane(s) 5a, 5b; the anvil 6 is moved in direction 12 around the pivot. The fiber is clamped and deflected by a pre-set distance to a stop (not shown) by the anvil 6 through a gap between the plane(s) 5a, 5b. Either or both planes 5a, 5b, together with their clamped fiber or fibers, swing downwards around a pivot (not shown) so that the stressed fiber is brought in to contact with a sharp blade 7 and the fiber(s) cleaves.

Figure 8B:
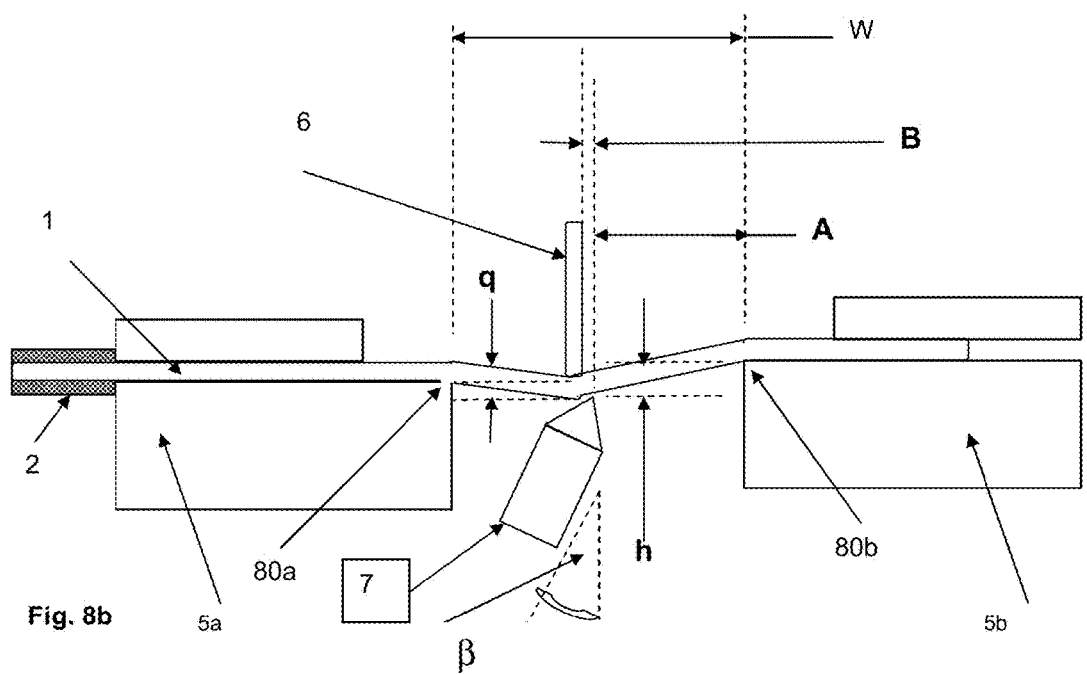
FIG. 8b shows the tool dimensions of a cleaving tool which carries out the method of the invention in the region of the blade when the tool is operated just prior to scratching the fiber.

In one embodiment, the fiber is bent at corners 80a and 80b. The clamps and corners may be at the same height or maybe at different heights. In addition, clamps 4a, 5a and/or 4b, 5b may move vertically during the action of the tool to bring the fiber or fibers in to contact with the blade 7. In a second embodiment, It may be advantageous to separate the clamping surfaces 5a, 5b from the bending points 80a, 80b with the fiber or fibers bent at intervening parts such as 81a, 81b which may be hard cylinders or otherwise, as shown in FIG. 8b. For instance, this allows independent design of the clamping properties of the surface and the bending properties of hard edges. The clamping surfaces 4a, 5a and 4b, 5b may be distant from the bending points 81a, 81b. In a third embodiment, the anvil 6 and bending point 81b can be linked together as a single rotatable part which is not in contact with the fiber when the fiber is initially loaded in to the cleaver and/or when the fiber is initially clamped, but rotation of the combined part brings it in to contact with the fiber or fibers at two points so bending the fiber.

The clamping mechanism 4b, 5b may be closely adjacent or part of the bending edge 80b and/or 81b. In a further embodiment, the bending edge 80b and/or 81b may be distant from these bending edges. It is also envisaged that tension may independently be applied to the fiber, for instance by vertical action of one or both of the clamps and/or by lateral separation of the clamps 4a, 5a and 4b, 5b. Such tensioning may also have the side-benefit of ejecting the fiber offcut at the distal end of the fiber.

Let us first consider the cleave obtained from a non-slanted, or perpendicular blade, i.e. $\beta=0°$. By non-slanted or perpendicular, what is meant is that the plane that bisects the blade angle is not slanted or is perpendicular to the undeflected longitudinal axis of the fiber clamped in the cleaving tool. Although deflection of the fibers of the prior art examples may induce a very small angle between the blade and the fiber in the prior art, these angles are typically very small, in particular as the blade is applied close to the anvil forming the deformation and accordingly at this point, as the fiber will always follow a curve as opposed to making tight changes of direction any induced angle by deflection will be much reduced in this area. The cleaver was set up with approximate dimensions of height h of 0.35 mm, height q of 0.2 mm, separation W of 4.8 mm, distance B from anvil edge to diamond blade tip of 0.5 mm and distance A from diamond blade tip to edge 80b of 2.0 mm. The shape of the end angled achieved is shown in FIG. 2a, with the core angled at 8° but with a reduced nose such that the fiber has a region X, close to the scratch, which is substantially perpendicular to the optic axis, with a glass protrusion of A1. It is understood that a different range of values of these parameters will also give a cleave with its core at an angle close to 8° from the perpendicular with a glass protrusion, $A_1$.

In order to measure the glass protrusion, A1, it is desirable to mount the cleaved fiber end vertically under an optical microscope so that the region of the fiber X is substantially horizontal under the microscope, i.e., the optic axis of the fiber is parallel to the optic axis of the microscope. Interference fringes can, for instance, be obtained from the light reflected from the cleaved end face using an interference lens, e.g. by using a 20×DI lens from Nikon company, Japan which incorporates a semi-silvered mirror internal to the lens obtaining stable interference patterns between the light reflected from the partial mirror in the lens and the light reflected from the mirror surface of the cleaved fiber. A single interference fringe shows regions of the cleaved fiber end face which are at the same height. This technique therefore gives a very accurate method of measuring height of the regions of the cleaved surface; the height difference between neighbouring fringes is ½ average wavelength of light or approximately 0.27 μm. By this measurement, approximately 11-12 fringes of height difference separate the scratch X and the middle of the core of the optical fiber, i.e. A1 is approximately 3-3.3 μm. Accuracy of measurement is +/−2 fringes, representing +/−0.5 μm. Similarly, repeatability of measurement is +/−2 fringes, representing +/−0.5 μm and there is a height difference of approximately 6 fringes or 1.5 μm across the width of the 10 micron wide single-mode core. The mounting jig was then tilted by 8° and the fiber rotated so that the 8° tilt was in the opposite orientation to the approximate 8° cleaved end of the core of the fiber. The core of the fiber was illuminated to identify the position of the core of the fiber. Circular fringe patterns over the core of the fiber confirmed that the end angle of the core of the fiber was 8°. The shape of the end face, showing lines of equal angle, derived from interference patterns taken at several angles, is shown in FIG. 2c.

It should be noted that the tension in the fiber prior to cleaving is controlled by the cleave dimensions and particularly by the amount of fiber bend, h. The tension in the fiber is adjusted so that there is some roughness or "hackle" visible on the cleaved end face close to the perimeter of the fiber; the greater the tension in the fiber prior to cleaving, e.g. by using a larger value of h, the larger the extent of the hackle. It will be understood that the fiber should be stressed sufficiently to cleave in a well controlled way and therefore it is better to have a slight excess of stress in the fiber prior to cleaving, leading to a limited amount of hackle, to ensure that every cleave will have enough tension to cleave well, even if there is a slight reduction in tension for an individual cleave due to tool variability. If insufficient tension is present, the blade will not bite in to the fiber and the cleave will not be well controlled. However, excess tension is deleterious because the hackle might intrude close to the core of the fiber and so might interfere with the transmission of light in the core. Typically, the tension in the fiber was adjusted to give a cleave with hackle confined to within about 10 μm from the perimeter of the cleaved fiber end.

Let us now consider the case for a slanted blade in accordance with the invention. The blade was slanted with $\beta=35°$. Similar values of cleave parameters to the above were used, i.e. h=0.35 mm, height q=0.2 mm, separation W=4.8 mm, distance B=0.5 mm and distance A=2.0 mm; a cleave was obtained. The tension in the fiber was adjusted by varying h to give a cleave with hackle extending inwards about 10 μm from the perimeter of the cleaved fiber. The shape of the cleaved end is shown in FIG. 2b.

The cleaved fiber was mounted vertically under a microscope so that the optic axis of the fiber was parallel to the optic axis of the microscope and interference fringes were obtained. Approximately 5-6 fringes separate region Y and the middle of the core of the optical fiber, i.e. $A_2$ is approximately 1.3 μm-1.6 μm. Both measurement accuracy and cleave-to-cleave repeatability were approximately +/−1 fringes or +/−0.27 μm. Tilting and rotating the mounted fiber and illuminating the core and observing the fringe pattern confirmed that the core was approximately 8° from the perpendicular. It can be seen that this invention reduces the projection of glass beyond the core of the fiber by approximately 50% and this significantly reduces insertion losses in an optical splice or pigtailing to an opto-electronic component.

It was also observed that the value of the glass projection, A2 is dependent on the tension in the fiber during cleaving. The higher the tension in the fiber prior to cleave, the smaller the reduction of the glass projection brought about by a slanted blade (compared to a perpendicular blade). Thus, for $\beta=35°$, increasing the tension in the cleave so that the hackle intrudes approximately 25 μm from the perimeter of the cleaved end face, increases the value of $A_2$ to approximately 6-10 fringes or 2.1-2.7 μm. This increase in glass protrusion can be understood because the stress in the fiber at the moment of cleaving is a superposition of stress applied by bending and the stress introduced by cutting. When the fiber is more highly tensioned due to bending by the anvil or tension in the fiber, the resultant internal stress arising from the bending is proportionally more controlled by the bending and less effected by the cutting force of the slanted blade and so the glass protrusion $A_2$ is greater.

Cleaves were also obtained for a slanted blade for $\beta=25°$, with similar cleave dimensions; the end angle across the fiber core was approximately 8° with hackle limited to about 10 μm from the perimeter of the fiber. Approximately 6-7 fringes separate region Y and the core of the optical fiber, i.e. $A_2$ was approximately 1.3 μm-1.6 μm.

Cleaves were also obtained for a slanted blade for $\beta=18°$, with similar cleave dimensions; the end angle across the fiber core was approximately 8° with hackle limited to about 10 μm from the perimeter of the fiber. Approximately 10-12 fringes separate region Y and the core of the optical fiber, i.e. $A_2$ was approximately 2.7 μm-3.2 μm.

It will be understood that other cleave dimensions may be used for the setting of the cleave tool. Thus, reducing the tension in the cleave will increase the effect of the slanted blade and so further reduce the value of $A_2$. However, due to tool variability, some fibers may be stressed less than expected and so the actual stress experienced may sometimes be too small to yield a controlled cleave. In addition, increasing the value $\beta$ to greater than 35° is likely to further reduce $A_2$ but there is a danger that the diamond blade will not be able to bite in to the fiber to create the starter crack for the cleave if the angle is too oblique. Similarly there is a greater danger of damage to the blade if it is slanted too much. Therefore, we observe that $\beta$ can be in the range of 1°-60° or preferably in the range of 18°-45° or most preferably in the range of 25°-35°.

The above description envisages a stressed fiber which is moved in to contact with a largely stationary blade. However, this invention also envisages an embodiment in which the fiber is stressed suitable for creating an angled cleave by bending and a slanted blade is moved in to contact with the stressed fiber. Provided there is a slanting between the blade and the perpendicular to the stressed fiber, there will still occur a change in the shape of the cleaved angled end, as envisaged by this invention.

The blade may be a polished sharp edge, for instance made from diamond, sapphire, SiC, metal or other hard material oriented in the <001> direction, with its faces polished with an included angle of about 60°, close to the mechanically hard {111} planes which maximises the blade strength. Other crystal planes and other included angles may also be used.

Figure 9A:
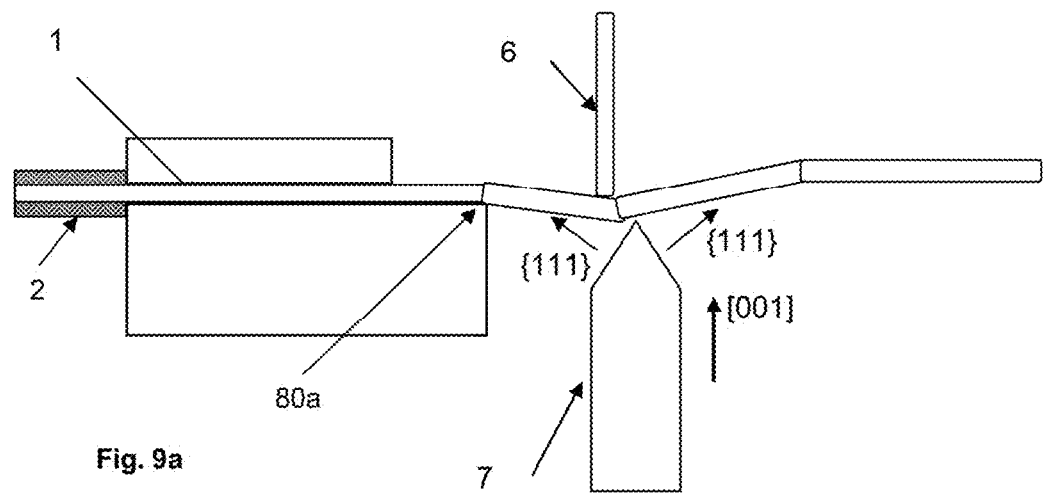
FIG. 9a shows the orientation of a prior art perpendicular polished diamond blade.

A symmetric diamond blade is shown in FIG. 9a for a perpendicularly acting blade, with the diamond material oriented in the <001> direction, with its faces polished with a symmetric included angle of about 60°, close to the mechanically hard {111} planes which maximises the blade strength. Other crystal planes and other included angles may also be used.

Figure 9B:
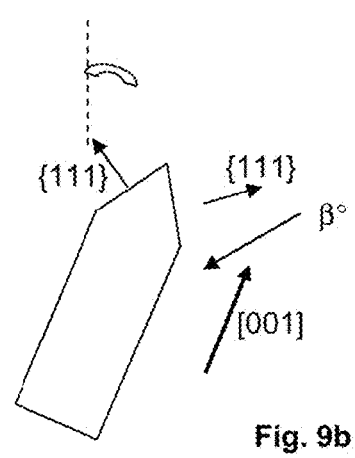
FIG. 9b shows a symmetric diamond blade mounted at β° in accordance with the invention.
Figure 9C:
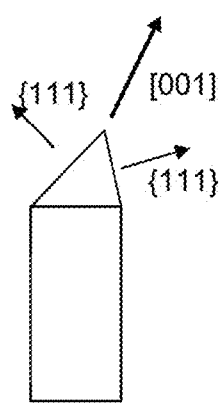
FIG. 9c shows a non-symmetric blade polished on {111} planes.
Figure 9D:
FIG. 9d shows a diamond blades polished at other angles.

In order to create a slanted blade, as used in this invention, this symmetric blade may be tilted and mounted at the angle $\beta$ or $\alpha$ as shown in FIG. 9b. Alternatively, the blade may be mounted perpendicularly and polished non-symmetrically, either with faces polished on {111} as shown in FIG. 9c. Alternatively, the blade may be polished otherwise, an example of which is shown in FIG. 9d. Other blade orientations are also envisaged in which the plane bisecting the blade angle, i.e., the angle formed by the two polished faces, intersects the fiber at a non-perpendicular angle, in particular at a non-perpendicular angle in the ranges described hereinabove.

Figure 10A:
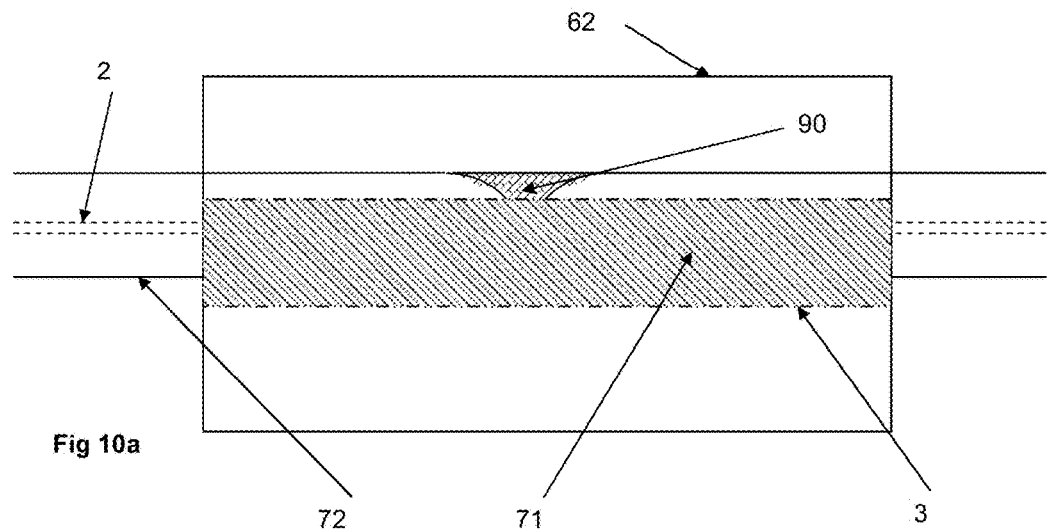
FIG. 10a shows a fiber optic housing containing two fibers, angle cleaved in accordance with the invention, held in a splice with index matching gel with no control of fiber orientation.

Two optical fibers are joined together in an optical splice. FIG. 10a shows a housing 62 containing a V-groove 3. Two cleaved optical fibers 71 and 72 are placed in the V-groove. One or both optical fibers are cleaved with an angled end face using a blade slanted at angle $\beta$ so that the protrusion of the glass beyond the core of the fiber is reduced. The end of the other optical fiber may be similarly angle cleaved or may be perpendicularly cleaved. Index-matching gel 90 is applied between the two cleaved fiber ends. The optical fibers are secured within the housing 62 to create a robust optical splice. Because of the reduced protrusion of glass arising from the use of the slanted blade, the orientation of the glass fibers relative to each other may be uncontrolled and yet still give a low insertion loss.

Figure 10B:
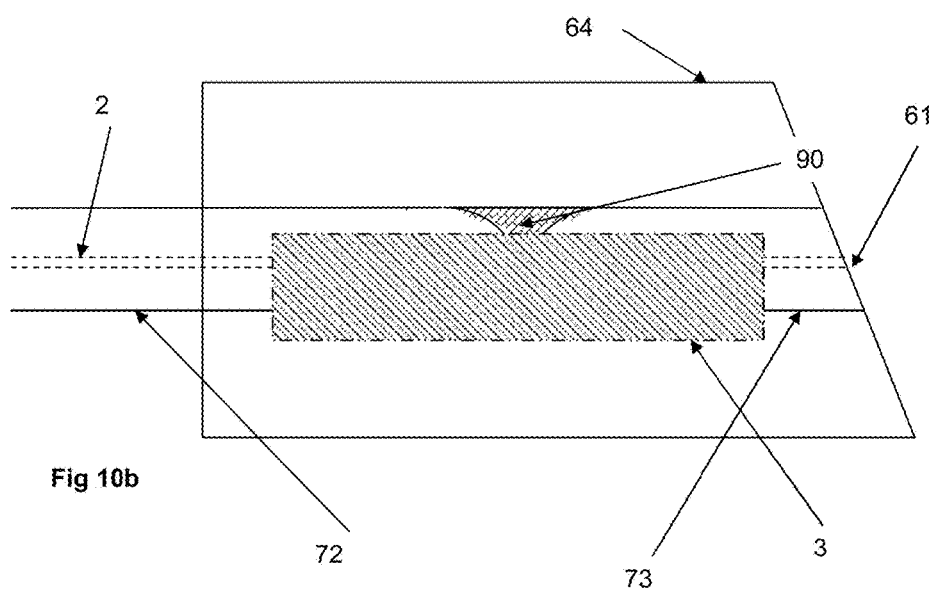
FIG. 10b shows an angle polished end 61 of a fiber optic connector internally spliced to a fiber, angle cleaved in accordance with the invention, with reduced glass protrusion on one or both internal ends with no control of fiber orientation.

A field termination can be made between an optical fiber and a pre-polished APC/FC angled connector. FIG. 10b shows a housing 64 containing 2 fibers in a V-groove 3. One fiber stub 73 is polished flat at an 8° angle to its optic axis level with face 61 as part of a APC/FC connector. The other end of fiber stub 73 is cleaved with an angled end face using a blade slanted at angle $\beta$ so that the protrusion of the glass beyond the core of the fiber is reduced. A second fiber 72 is angle cleaved using a slanted blade and butted up against the fiber stub 73. Index matching gel 90 is used. The housing 64 secures the 2 fibers in position. The reduced glass protrusion arising from angled cleaving using a slanted blade gives low insertion loss whatever the respective orientation of the two fibers.

It is also understood that the orientation of the two fibers making up the optical splice of FIG. 10a or the connector of FIG. 10b may be controlled. Industry practice uses a holder to hold the fiber prior to insertion in the cleaving tool, for example 3M Inc.'s Fibrlok II fiber holder and Sumitomo QSC-900 fiber holder. Therefore, the angle cleave on the end of the fiber has a largely pre-determined orientation with respect to the fiber holder.

FIG. 11a shows a fiber holder with its base 90a and lid 90b and hinge 90c holding the single-mode fiber 1 and its coating 2. FIG. 11b shows an orthogonal view of the fiber holder and fiber. The fiber holder is sitting on its flat base 91. As can be seen opposing faces of the fiber holder are both flat with no projections such that the fiber holder can be placed two different orientations in the cleaving tool, or when forming a splice. FIG. 11c shows the holder with its fiber placed in the angled cleaving tool 100 wherein the cleave tool uses a perpendicular acting blade 7. After cleaving, the orientation of the angle cleaved end face 101 is largely fixed with respect to the holder and its flat base 91, as shown in FIG. 11d; the longest part of the glass protrusion X (also shown in FIG. 2a) is at the bottom of the cleaved fiber closest to the flat face 91 of the fiber holder.

Figure 6A:
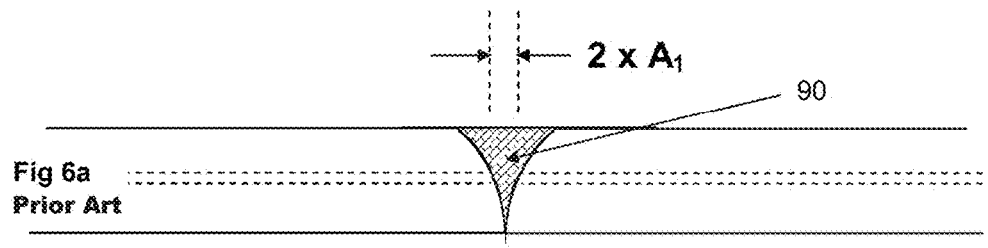
FIG. 6a shows two angled cleaves arising from bending and scratching with a perpendicular blade, as known from the prior art, butted together in a V-groove in which the orientation of the fibers give a maximum gap of $2*A_1$ between the cores.
Figure 6B:
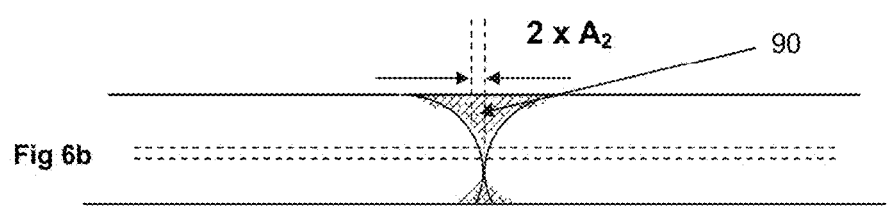
FIG. 6b shows two angled cleaves arising from bending and scratching with a blade slanted at β°, in accordance with the present invention, butted together in a V-groove in which the orientation of the fibers give a maximum gap of $2*A_2$ between the cores.
Figure 6C:
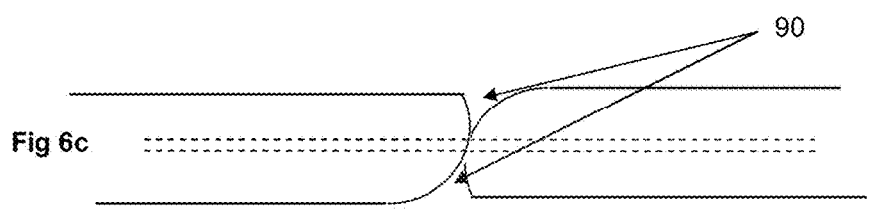
FIG. 6c shows two angled cleaves arising from bending and scratching with a blade slanted at β°, in accordance with the present invention, butted together in a V-groove in which the orientation of the fibers give a substantially zero gap between the cores.
Figure 6D:
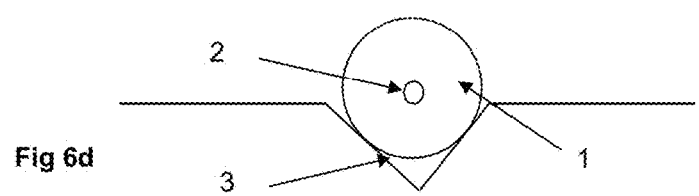
FIG. 6d shows the end view of a fiber in a V-groove.
Figure 6E:
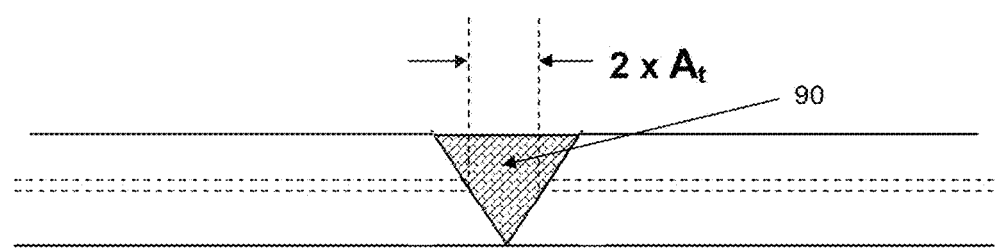
FIG. 6e shows two angled cleaves, made in accordance with a prior art method, butted together in a V-groove in which the orientation of the fibers give a maximum gap of $2*A_t$ between the cores.

FIG. 11e shows a splice 62 made using two such angled cleaved ends in their fiber holders. In order to achieve a splice whereby the cores of the angled cleaved ends achieve a close approach, one of the fiber holders and its cleaved fiber is inverted with respect to the other, as shown In FIG. 11e to allow close approach of the fiber cores; if the two fiber holders are pointed towards each other but with their flat bases 91 both downwards, the cores of the fibers in the splice will be prevented from approaching each other by the glass protrusion present in an angled cleave, as shown in FIGS. 6t, 6a and 6b. The splice is opened to allow entry of the fibers, the two fiber holders are slid together in directions A and B until the cleaved fiber ends contact each other inside a common V-groove (not shown) and the splice 62 is closed such that the cleaved fibers, which are located in the V-groove, are clamped in to position with respect to each other and the fiber holders are removed. Note, in FIG. 11e, one holder is inverted to achieve a close approach of the cores when making the splice. The holders will preferably be marked on their external surfaces to easily allow for identification of their orientation.

Figure 12A:
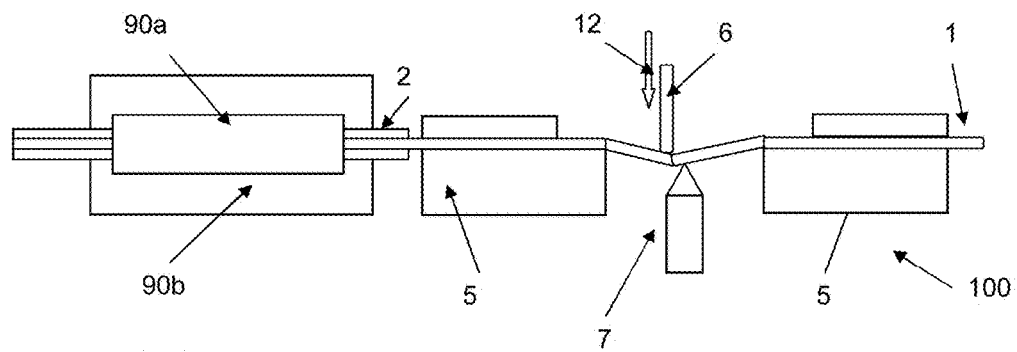
FIG. 12a shows an optical fiber held in a vertical fiber holder being cleaved for splicing in accordance with one aspect of the invention.
Figure 12B:
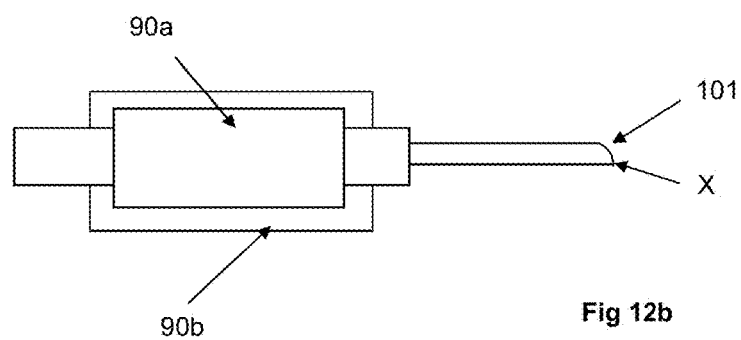
Figure 12C:
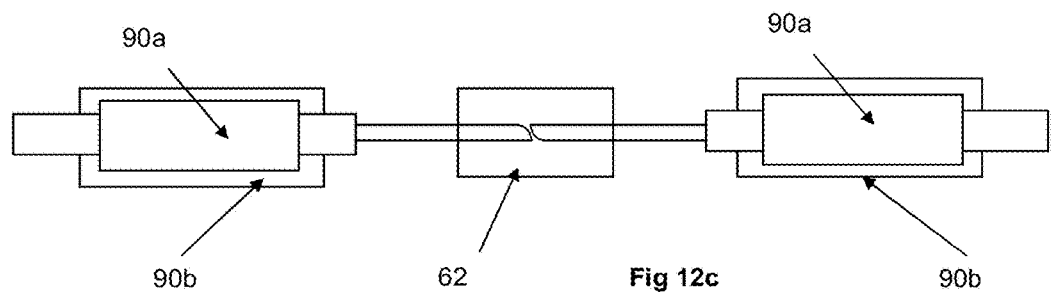
FIG. 12c shows a side view of a splice formed between two angle cleaved fibers held in their holders and pushed together in accordance with one aspect of the invention.

It is also possible to make a splice without inverting one of the fiber holders when the two holders are pointed towards each other as they enter in to the splice. To do so it is required that the orientation of the angle cleave is rotated by 90° with respect to the flat base 91 of the holder. The fiber holder and its fiber may be placed in the cleaver 100 so that the holder's flat base 91 is vertical, i.e. the holder is rotated by 90° around an axis parallel to the fiber axis. FIG. 12a shows the fiber holder placed in the cleaver with the holder base and its lid visible, i.e. its flat base is vertical. FIG. 12b shows the fiber holder with its flat base lying down and shows the orientation of the angled cleave. A second fiber in a second holder is also angled cleaved with the same sense of rotation as the first holder. FIG. 12c shows an optical slice 62 constructed using both such angled cleaved fibers in their holders, with both holders pointing towards each other and both holders sitting on their flat bases. The angled fiber ends match and the cores of the fibers approach each other closely. Alternatively, the fiber holder is placed flat in a cleaving apparatus but the cleaving apparatus is rotated by 90° around the axis of the fiber, i.e. the cleaver is stood up vertically. Again, when a splice is made between two such angled cleaves, the orientation of the angled ends are matched and so the cores can approach closely, giving low insertion loss.

A prior art perpendicular-acting blade is described in FIGS. 11a-11e. In these cases, a low-loss splice can be achieved using the splicing method including inverting one end of the splice even though there is significant projection of glass beyond the core of the angle-cleaved fibers. The low loss is achieved because the angled cleaves are matched in orientation. However, there are still advantages in making a splice from angle-cleaved ends made using a slanted blade of the invention slanted by β° as described herein. In practice, with either a perpendicular blade or a slanted blade, the orientation of the angle cleaved ends may be rotated by up to 25° or more relative to the holders due to residual torsion in the fiber or otherwise, so that the maximum glass protrusion X can not be relied upon to be precisely at the bottom of the cleaved fiber. If a splice is made from two such cleaved fibers, the cores of the fibers may be slightly separated due to the angular offset of the projection relative to the holders, giving an insertion loss. It is therefore desirable to cleave the fiber with a blade slanted by α° so that the glass protrusion is less than the case with a prior art perpendicular blade and so there is a greater chance that the cores will approach closely giving low insertion loss. Similarly, a multimode fiber may be cleaved at an angle using a blade slanted by α° in order to maximize the amount of the large core which is angled. In this case it is necessary to align the fibers as described above so that the angle cleaved end faces match in the splice to ensure close approach of the cores.

The optical splices 62, described above, is of general construction and may include industry standard splices such as the RECORD Splice available from TYCO Inc, Harrisburg, Pa., USA, or FIBRLOK from 3M Inc., Austin, Tex., USA or from Sumitomo, Tokyo, Japan or otherwise. The splice 62 may or may not include index matching gel to reduce optical insertion loss.

Figure 13A:
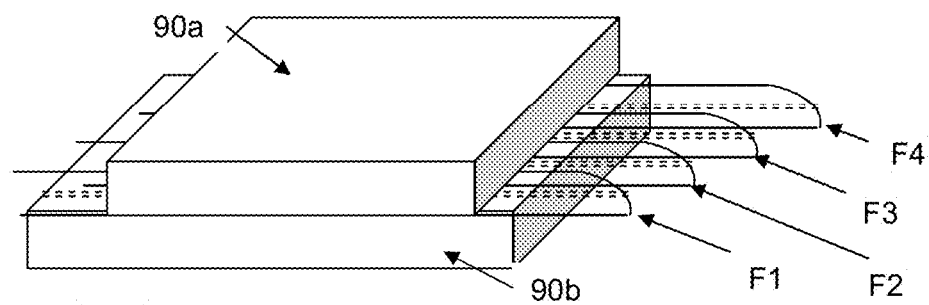
FIG. 13a shows an angle cleaved ribbon fiber.
Figure 13B:
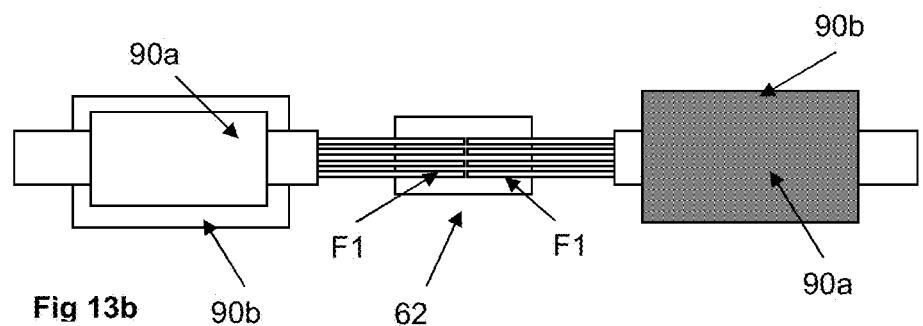
FIG. 13b shows the top view of a splice made with two angle cleaved fiber ribbons, with one of the fiber holders inverted.
Figure 13C:
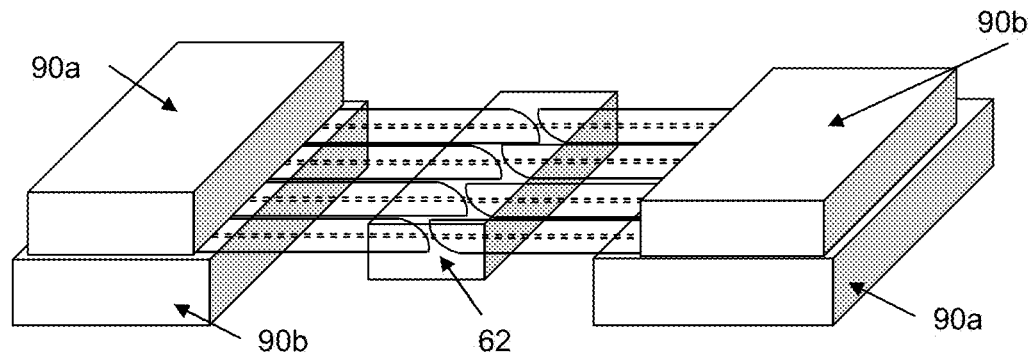
FIG. 13c shows an isometric view of the splice made in FIG. 13b.

It is also required to form a splice between a linear array or ribbon of angle-cleaved fibers containing 2, 3, 4 or more single mode or multi-mode fibers, with the ribbon held in a fiber holder. A splice is made by butting together the cleaved ends of 2 such angle-cleaved ribbons, and the splice is made whilst each fiber ribbon is still held in its fiber holder; the splice may contain index-matching gel. Ribbons containing up to 12 or 24 fibers or more may be so cleaved. However, it is necessary to invert one of the holders to achieve a splice, as shown in FIG. 13b and its isometric view FIG. 13c, making a close approach between the fiber cores and so a giving a low insertion loss.

Figure 13D:
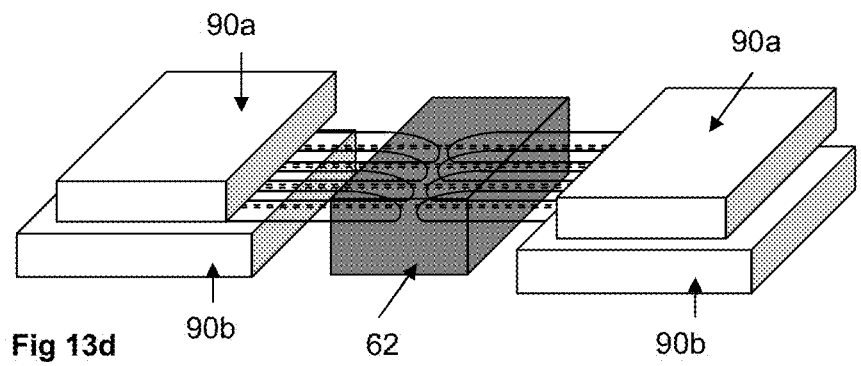
FIG. 13d shows a splice made with two angle cleaved fiber ribbons using a slanted blade with the fiber holders non-inverted.

The use of a blade angled at β° to angle cleave a ribbon fiber will give rounded angled ends with minimal glass protrusion beyond the cores. FIG. 13d shows a splice 62 made with fiber ribbons angle cleaved with rounded angle cleaved ends. The two fiber holders are both lying flat but the cores of the individual fibers are able to approach each other closely because of their rounded ends, giving a low insertion loss. Again, it is advantageous to use a blade slanted at β° to angle cleave the ribbon even if one of the fiber holders is inverted when two ribbons are joined in the splice. The reduced glass protrusion arising from using a slanted blade will make the splice more tolerant of rotation of cleaved ends face or other cleave errors because the fiber cores approach more closely, giving a lower insertion loss.

It is desirable to use rounded angled cleaved ends, as obtained from cleaving with blades angled at β° so that splices can be made between ribbons of fibers whilst maintaining the specific arrangement of the individual fibers within a ribbon. Thus FIG. 13b shows that fiber F1 in one ribbon is joined with fiber F1 in the other ribbon when one of the holders is inverted when they are spliced. The cores of the fibers will approach each other closely because the angle cleaved ends are matched. It is also desirable to use rounded angled cleaved ends obtained from a blade slanted at β° so that the cores approach each other closely even when the angle cleaving is not perfectly controlled.

Figure 14A:
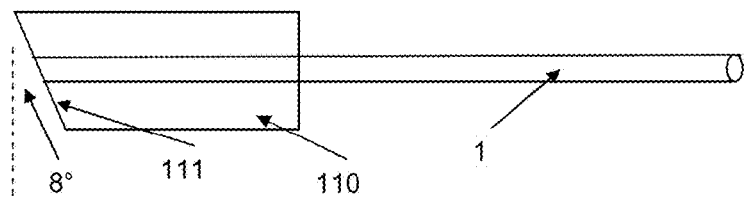
FIG. 14a shows a fiber held in a ferrule with a pre-polished end.

Field terminated FC/APC connectors are widely used, whereby a factory-prepared angled end face is polished on to a fiber held in a ferrule and fiber exiting from the other end of the connector is spliced to the network fiber, i.e. the fiber which will be used in the optical fiber transmission network. Traditionally this splice has been fusion spliced. FIG. 14a shows a single mode fiber 1 glued in to a ceramic ferrule 110 whose end face 111 is polished at an angle of 8° away from perpendicular. In the invention an angled mechanical splice is made between a stub of cleaved fiber within the connector body and an angled cleaved network fiber (see FIG. 14e). The internal fiber stub is angle cleaved using a sharp blade or otherwise, such as using a laser cleaver or similar. Mechanical integrity of the field splice is ensured because the angled splice is within the body of the connector. In order to ensure minimum insertion loss the orientation of the cleaved ends are controlled as described herein in the spliced connector so that end face separation and therefore insertion loss is minimised.

Figure 14B:
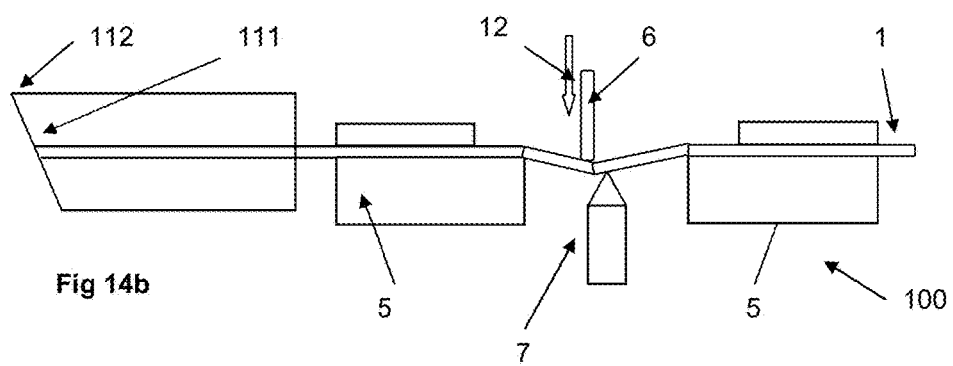
FIG. 14b shows the fiber and ferrule of FIG. 14a in an angled cleaver of the invention.
Figure 14C:
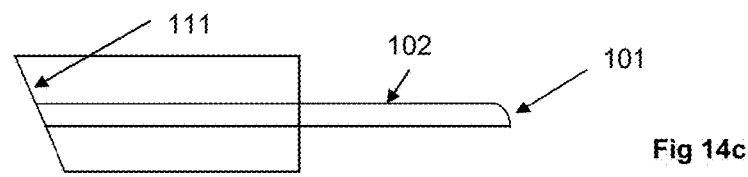
FIG. 14c shows the orientation of the angled cleave arising from FIG. 14b.
Figure 14D:
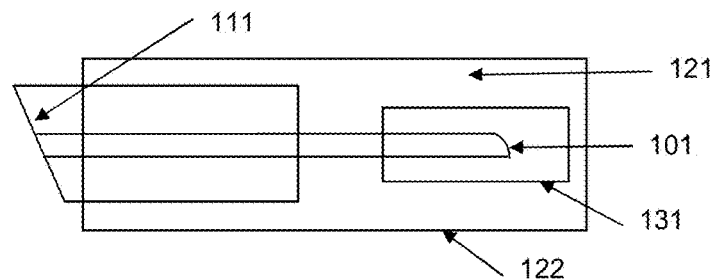
FIG. 14d shows the angle cleaved fiber and ferrule in a connector body.

FIG. 14b shows the ferrule placed in the angled cleaver 100 where the longest portion 112 of the polished end face 111 of the ferrule is uppermost in the cleaver. The cleaver is operated to produce an internal stub 102 which has an angled end 101 as shown in FIG. 14c. The angle cleaved end 101 produced by the cleaver, and specifically the core of the fiber, is approximately parallel to the polished end 111. A connector body 121 may also be placed around the polished ferrule, as shown in FIG. 14d and the cleaved end 101 and a fiber alignment device 131, which may be a V-groove made of metal, plastic or otherwise, is provided within the connector body. The orientation of the connector body 121 is easily known, either because the connector has a flat bottom 122 or there is some other keying device to indicate the orientation.

A splice is made between the angle-cleaved stub 101 and the network optical fiber 141 which is to be connected. The fiber alignment V-groove 131 is opened and the connector 121 is inverted and mated with an angle cleaved fiber 141 held in a fiber holder; the fiber holder lies on its flat bottom 91. Index-matching gel may be used. Alternatively the connector is not inverted but the fiber holder is inverted or it so arranged that the relative orientation of internal angled fiber stub and the angle cleaved fiber held in the holder is such that the two angled ends mate together with minimal separation of the fiber cores giving a low insertion loss. In these cases, the orientation of the internal fiber stub and the angle-cleaved fiber 101 are in-phase—i.e. they are mated to reduce the separation of the fiber cores. The field termination is completed by closing the V-groove 131 and removing the fiber holder 90a, 90b. It is also understood that the angle cleaved network fiber may be spliced to a connector in which the internal angle cleaved stub is prepared by either angled cleaving using a sharp blade or by laser cleaving or similar.

When the relative orientation between the angle cleaved internal fiber stub and the angle cleaved network fiber is controlled so that they are in-phase, it is also advantageous that the internal fiber stub 101 and/or the cleaved fiber end 141 is angled cleaved using a blade slanted by $\beta°$ to give a rounded angled end and so ensure that the glass protrusion beyond the core of the angled fiber is minimal and so the splice is resilient to variation in angling of the end faces.

It is also understood that the use of blade slanted by $\beta°$ to angle cleave the internal fiber stub and/or the network fiber is desirable even if the relative orientation of the angled ends are not in-phase. The rounded angled cleaved ends allows close approach between the internal fiber stub and the network fiber and so gives a low insertion loss with or without the use of index matching gel.

A blade angled at $\alpha°$ may be used to angle cleave the internal fiber stub 101 and/or the cleaved fiber end to form a splice between a multimode fiber 141 and an internal fiber multi-mode stub 101 to form an angled splice. The use of a blade angled at $\alpha°$ gives a large proportion of the multimode core angled for reduced back-reflection. In this case the relative orientation between the internal fiber stub and the network fiber is controlled so that they are in-phase and so the cores approach closely for reduced insertion loss.

It may also be desirable to use a blade slanted at $\beta°$ to angle cleave polarization-maintaining (PM) fiber in forming a splice between two lengths of such fiber or between such fiber and a connector with an internal fiber stub. The relative orientation of the fiber-to-fiber or fiber-connector is controlled as above to achieve matching between angled cleaved ends. In addition, the orientation of these angle cleaved ends may also be controlled relative to the fast- or slow-axis of the PM fiber to advantageously control the propagation characteristics of the light travelling in the PM fiber.

Multiple fiber connectors are widespread in the industry in the form of MPO connectors and similar. The splice produced by orientating an angled cleave made with a blade slanted at $\beta°$ will be advantageous for splicing multi-fiber connectors directly to a fiber ribbon, such that the multi-fiber connector contains a fiber ribbon which is factory pre-polished at an angle, and each fiber of the ribbon has an angled cleaved internal fiber stub and the orientation of these components is controlled relative to each other to minimize insertion loss.

FIG. 15a shows the multiple fibers 301 of a multi-fiber ribbon in a ferrule 202 placed in the cleaver so that the longest part 312 of the pre-polished end face 203 is uppermost in the cleaver 100. The fiber ribbon is angle cleaved using slanted blade. FIG. 15b shows the orientation of the cleaved end faces 101 of the multiple internal fiber stubs 210. FIG. 15c shows the orientation of the angle cleaved fiber stubs relative to the pre-polished end face if the ferrule is placed in the cleaver with the longest part of the polished end face is downwards in the cleaver.

It is also understood that angled cleaving of the fiber stubs in the connector can be cleaved using a sharp blade but may also carried out using a laser cleaver or otherwise. The orientation of the angled ends of the fiber stubs should be controlled with respect to the orientation of the polished end face, with the angled ends of the cores of the fiber approximately parallel to the polished end face individual fibers (FIG. 15b) or with the internal stubs slanted in the opposite direction (see FIG. 15c).

FIG. 15d shows a splice consisting of a connector body 201 which contains multiple fibers in a ferrule 202 and which have a pre-polished end 203. The fibers have internal stubs 210 which are angle cleaved, either by using a sharp blade or otherwise, such as with a laser cleaver or similar. A network fiber ribbon, consisting of multiple optical fibers 220 in a protective coating 221, is held in a fiber ribbon holder consisting of a lid and base 290a, 290b, respectively, and a flat base 291. The network fiber ribbon is angle cleaved 141 using a slanted blade as above. The internal stubs and the angle cleaved network fiber are joined together in a splice 131, consisting of an array of V-grooves which may be opened for fiber insertion and is closed to clamp the fiber ends and make the final splice. The fiber ribbon holder and the ferrule and connector body are oriented so that the cleaved fiber ends are in-phase.

FIG. 15e shows an orthogonal view of the splice. The ferrule and connector body are oriented as shown in with the angled end faces substantially parallel to the angle cleaved end faces, the ribbon fiber holder is orientated so that the angle cleaved end faces are in-phase with the angled internal stubs. Of course., by inverting the fiber ribbon holder, it is also possible to arrange the angled internal stubs and the angled network fiber ribbon to be in-phase if the pre-polished end 203 is not parallel to the angle cleaved internal stubs—e.g. as shown in FIG. 15c.

FIG. 15 shows a splice made by using angled cleaving of the fiber ribbon and internal fiber stubs. It is here desirable to arrange the orientation of the ribbon fiber holder with respect to the multiple fiber ferrule so that the cleaved end faces are in-phase. This invention uses a sharp blade slanted at $\beta°$ to angle cleave the ribbon and/or the internal fiber stubs. The relative orientation of the angle cleaves of the fiber ribbon and the internal fiber stubs would be the same as shown in FIG. 15 but the provision of rounded angled ends allows greater tolerance of the splice if the angle cleaves are not perfect.

In addition, this invention also envisages the use of a sharp blade slanted at $\beta°$ to angle cleave the ribbon and/or the internal fiber stubs. The rounded angled ends will have a smaller protrusion of glass and so acceptable insertion loss will occur even if the angle cleaved ribbon and internal fiber stubs are oriented opposite to that shown in FIG. 15. This may be desirable for ease of use in making the splice.

The technique can be used to simultaneously cleave multiple fibers in a ribbon. The blade is slanted. The tension in the fiber may arise solely from bending the fibers in to the hole in the clamping surfaces or the tension may be increased by sloping the clamping surfaces or otherwise. It should be noted that a ribbon fiber is flat and so has a natural orientation so that it is introduced horizontally in to the cleave tool. Therefore, a ribbon fiber may be angle cleaved and the angled ends will all have substantially the same orientation with respect to the flat of the ribbon. Two such ribbons may be spliced together so that the orientation of the angled ribbon ends is known within the ribbon splice. Therefore, no holder is required to hold the ribbon fiber during cleaving. The tool would be modified so that guidance dowels, a channel or similar, is provided so that the ribbon fiber in its encapsulation may be laid straight so that the fibers are presented with the blade edge lying perpendicular to the axis of the fiber and ribbon. The cleave length would be set by positioning the end of the encapsulation in the tool.

Prior to splicing two angle cleaved ribbon ends together, they may easily be inverted with respect to each other to cause the angled ends to mate together. As a slanted blade is used, the glass protrusion will only be as large as A2 and the two ribbon cleaves may be inverted with respect to each other or the ribbon may be spliced without inverted one of the ribbons.

Figure 14E:
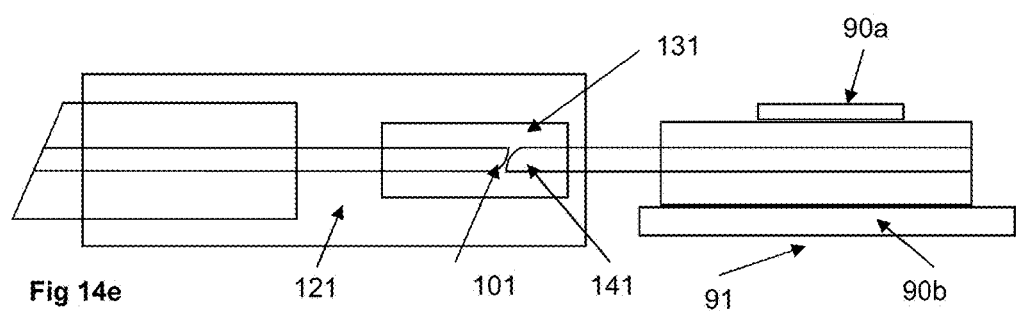
FIG. 14e shows a splice made between the internal angle cleaved fiber stub in the connector and an angle cleaved fiber held in a fiber holder in the orientation that allows the two angled cleaves to mate together in-phase.

Similarly, a ribbon fiber can either be cleaved whilst held in a holder or cleaved without the use of a holder, and this angle cleaved ribbon fiber can be spliced to a pre-prepared angle cleaved ribbon fiber whose other end is polished, e.g. as in a MPO-type connector, as shown in FIG. 14e.

It is also understood that the angle cleaved network fiber ribbon may be spliced to a multi-fiber connector in which the internal angle cleaved stubs are prepared by either angled cleaving using a sharp blade or by laser cleaving or similar.

We now describe a cleave tool as shown in FIG. 16a and this may be used with a blade which is mounted perpendicularly or slanted at an angled α or β. FIG. 16b shows the extrusion used as the chassis 407 of the cleave tool. The fiber(s) are stripped of their plastic coating and preferentially loaded in to the fiber holding device. The fiber holder is placed in the groove 419 in the protruding tool handle and pushed up against a stop 420 to fix the cleave length. The fiber holder may also be held down in the groove 419 using a suitable clamp to prevent it being pulled out by the weight of the fiber cable. The stripped optical fibers pass between dowels 421 and 422 to align the fiber(s) and rest on clamping ridges 423 on two separate clamp tables, with the fiber(s) passing over a gap. The top of the clamping ridge may be anodized aluminium, steel or other hard surface. Preferentially, one or both of the clamping ridges 423 may be coated with an elastomeric substance such as polyurethane or other compliant material to reduce any possible damage to the fiber as it is clamped on to the clamping ridges. Typically the thickness of the polyurethane is in the range of 10-100 μm or more preferably in the range 30-100 μm. A sharp diamond blade is arranged in the gap at a level just below the top of the clamping tables.

The fiber(s) are clamped on to each of the clamping tables using elastomeric clamps 402a, 402b. Preferably, these clamps are made of EPDM or similar elastomeric material. The clamps are held on a swinging arm 401 which also incorporates the anvil which may be 1-armed or 2-armed, giving an angled or perpendicular cleave, respectively.

It is desirable to clamp the fiber by elastomeric clamps both above and below the fiber because the coefficient of friction for such materials is of order 0.5, i.e. significantly larger than if the fiber is clamped on a metal surface. The large coefficient of friction allows a larger tension to be held in the fiber without the fiber slipping through the clamps. A sufficiently large tension is desirable in a fiber as it is scratched and so it cleaves in order that the cleaved surface is well controlled and flat to allow subsequent splicing of such cleaved fibers to take place. A tension of 2N is well known to give a flat perpendicular cleave. A similar tension is required for an angled cleave otherwise the angle-cleaved surface will be highly curved and substantial parts of the cleaved end face will be missing and so unavailable for subsequent splicing. In order that a tension of 2N is present in the fiber prior to cleaving a single fiber, the clamping force required is 2N/(coefficient of friction), giving a clamping force of about 4N for each clamp, assuming an elastomeric clamp. Because the fiber must be clamped at two points, an operating force of at least 8N is required to adequately clamp a single fiber to maintain a 2N tension in the fiber. If multiple fibers are cleaved simultaneously, each fiber must be similarly clamped and so a clamping force of approximately 96N is required to properly cleave a 12-fiber ribbon. If non-elastomeric clamps, such as anodized aluminium, are used for one or both clamping points, significantly higher clamping forces would be required to maintain tension in the fiber and this would be deleterious for the operation of the cleave tool.

To operate the tool, the swinging anvil firstly clamps the fiber(s) and the anvil comes in to contact with the fiber(s), displacing them downwards so that they come in to contact with the sharp edge of the diamond blade. Because the fibers are bent in to the gap 408, they are both tensioned and bent, and so when they come in to contact with the sharp blade, they are scratched and so cleaved. If the fiber(s) are bent asymmetrically, using a 1-armed anvil, the cleave will be angled. However, if the fiber(s) are bent symmetrically, using a 2-armed anvil, the cleave will be substantially perpendicular. The diamond blade may be mounted so that it is vertical, in which case an angled cleave (using a 1-armed anvil) will be as shown in FIG. 2a. Alternatively, the blade may be slanted, in which case an angled cleave (using a 1-armed anvil) will be as shown in FIG. 2b. The blade will be vertical in the case of a perpendicular cleave. For a typical tool, there is a 2-15 mm gap between the two clamping tables. In order to obtain a mirror smooth cleave with minimal roughness/hackle at the perimeter of the cleaved fiber end, the height of the clamping tables above the top of the sharp blade must be approximately in the range of 0.125 mm to 0.5 mm. A greater height difference will give unacceptable hackle of the cleaved fiber end and a smaller height difference would lead to inconsistent cleaving and possible blade damage. It is desirable to have the cleaved offcut fiber at least 0.125 mm above the cleaved working-fiber end (i.e. the end which is later used in the splice) to avoid damage if the cleaved fiber ends clash; it is therefore preferential that there is a slight difference in height settings of the clamp tables to obtain the optimum tension in the cleave. We have determined that the height of each clamp table must be set to an accuracy of about +/−0.05 mm. Such dimensional accuracy is difficult to obtain with a machined tool, particularly because the diamond blade may vary in its position below the clamping surfaces. It is therefore desirable to be able to adjust the height of the clamping tables relative to the top of the sharp blade when the tool is first set up or during operation.

The anvil 401 and its two elastomeric clamps 402a, 402b swing around a pivot 403. The anvil is sprung upwards to a pre-determined opening (spring not shown) and is stopped from fully opening by pin 420. A tool clamp for use to lock down the anvil during travel is also envisaged as a pin passing through hole 421. The independent clamp tables 404a, 404b are created by machining the table 405. Screws 406a, 406b are located in each clamp table and act against the base 407. The set screws 406a, 406b can be used to bend the clamp tables 404a, 404b up or down so that the height of each clamp table can be independently set with respect to the top of the sharp blade which is located in slot 408 and attached to the base 407. Preferentially, the clamp tables 404a, 404b are bent elastically by the screws 406a, 406b to prevent fatigue cracking and damage to the cleave structure of the cleave tool. This is achieved by ensuring the that material at bend 411 is suitable long and thin so that bending does not exceed the elastic limit of the material which makes up the extruded chassis which may be an aluminium alloy or otherwise. The fiber holder groove may also be supported by a screw 406c. An open or closed tube 412 serving as a bin for the offcut fibers may also be included which is located in the recess between the clamp tables 406a, 406b, 406c. The tube 411 can be swung out around pivot 413 to allow disposal of fiber offcuts and may be held closed using a spring detent.

Figure 17A:
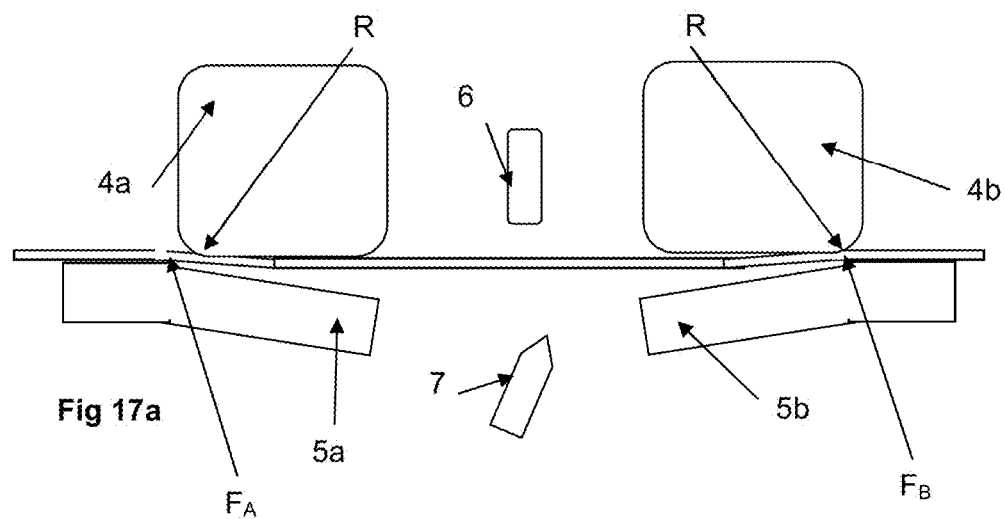
FIG. 17a shows the fiber(s) at the initial time of clamping with the clamping planes sloped in the region of clamping.
Figure 17B:
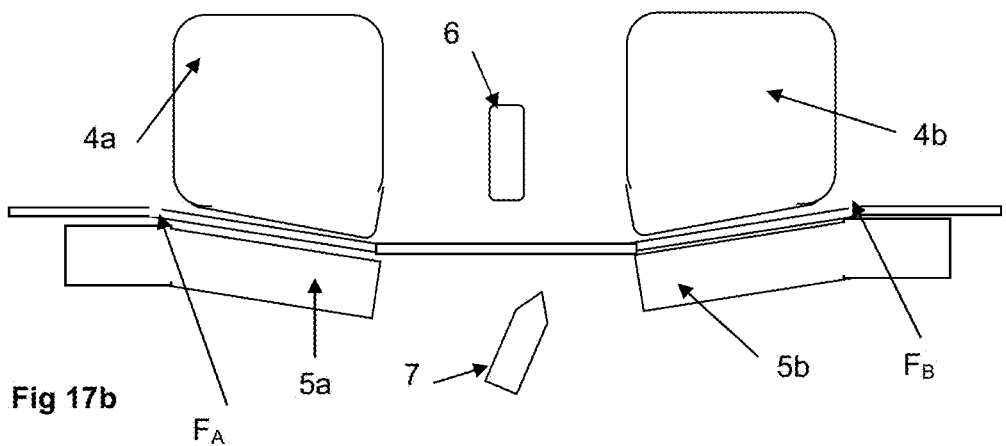
FIG. 17b shows the fiber(s) fully clamped, with the fiber tensioned due to the sloped clamping surfaces.
Figure 17C:
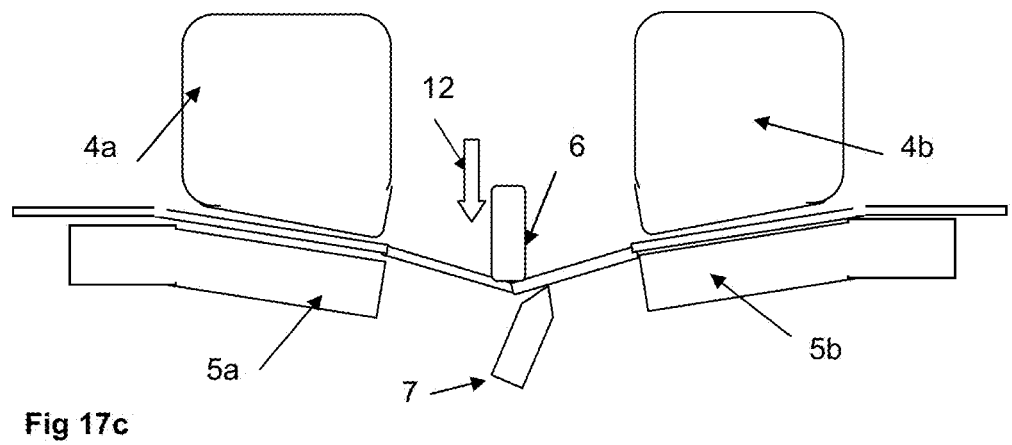
FIG. 17c shows the clamped fiber(s) deflected by the anvil and cleaved.

Preferentially, the angle-cleaved end face should have a minimal glass roll-off length of less than 50 microns (AROLL_OFF in FIG. 2a) to avoid insertion loss arising from misplacement of the cleaved fiber ends in the splice or connector. AROLL_OFF can be decreased if tension is induced in the fiber in addition to the tension arising from bending. FIG. 17a-c shows a technique for tensioning the fiber(s). One or both of the clamping surfaces 5a and 5b are sloped so that the elastomeric clamps progressively clamp the fiber as the tool is operated. FIG. 17a shows the initial clamping in which the corners R of the two elastomeric clamps 4a, 4b first touch and begin to clamp the fiber or fibers. FIG. 17b shows the fiber(s) fully clamped by the elastomeric clamps as the tool is further operated. The length of fiber(s) between points FA and FB is greater in FIG. 17b compared to FIG. 17a because the fiber(s) are stretched as they are clamped on to the sloped clamping surfaces 5a, 5b. There is therefore added tension in the fiber and when the fiber cleaves, as shown in FIG. 17c, the glass roll-off length is reduced. The presence of extra tension in the fiber will produce cleaves which are at an angle slightly closer to the perpendicular and the glass protrusion A2 will be more similar to A1. However, the extra tension will give a more repeatable cleave.

Figure 7A:
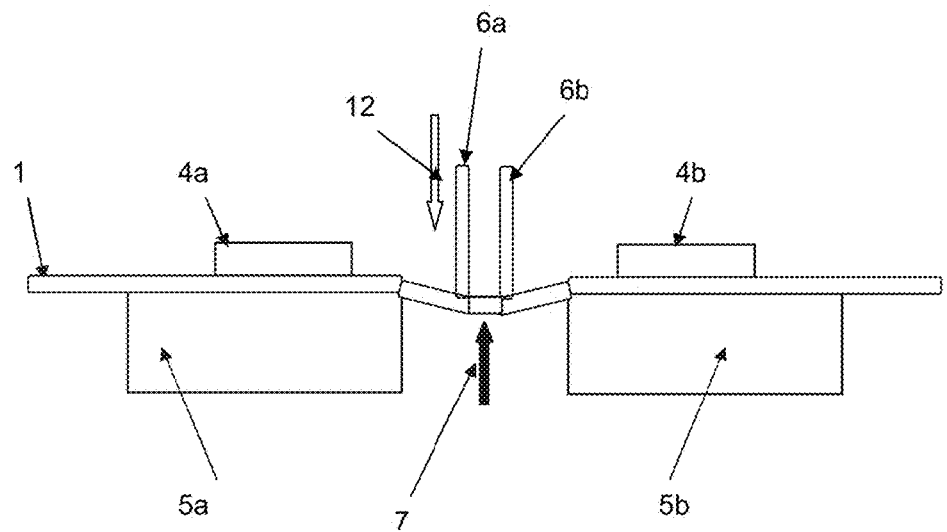
FIG. 7a shows a prior art example of a fiber being cleaved using a 2 armed anvil and a blade acting normal to the fiber, giving a perpendicular cleaved fiber end.
Figure 7B:
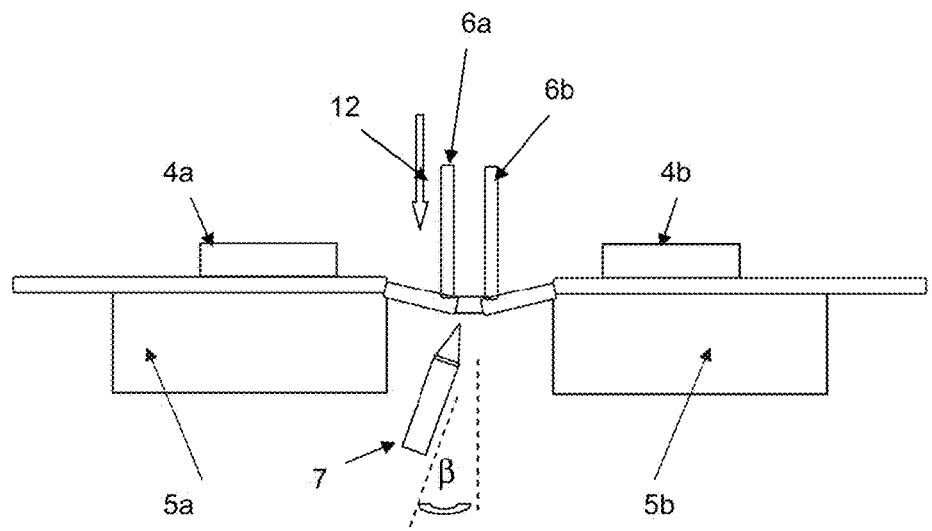
FIG. 7b shows a fiber being cleaved in accordance with the present invention using a 2 armed anvil and a blade acting at an angle β to the normal to the fiber, giving an angle cleaved fiber end.

The facility of generating extra tension in the fiber can also be used if the tool is used to cleave fiber(s) perpendicularly, for instance by using a symmetric two-armed anvil with the blade t scratching the fiber between the two arms of the anvil, as shown in FIG. 7a. The additional tension will give a flatter cleave, closer to the perpendicular.

The same cleave tool with the same settings can be used to cleave either a single fiber or a multiple-fiber ribbon. The fiber ribbon is stripped thermally or otherwise, and laid in the cleave tool with all fibers passing across the hole in the reference planes. Each fiber must be clamped at two points, preferably by elastomeric clamps, on to the two reference planes. When the tool is operated, each fiber in the ribbon is similarly clamped by the elastomeric clamps and deflected by the anvil so that they all come in to contact with the diamond blade at substantially the same time and so cleave substantially simultaneously. Assuming that the ribbon is clamped horizontally, the edge of the diamond blade should be substantially horizontal so that all fibers see the same bend between the bottom of the anvil and height clamping surfaces. If the edge of the diamond blade lies substantially perpendicular to the ribbon, the cleave length will be substantially the same (within about 25 μm) so that the cleaved ribbon can be spliced to a similar ribbon without gaps appearing between some of the fibers in the ribbon splice.

The total force to operate the tool, i.e. the total clamping force, is distributed approximately evenly between each fiber in the ribbon, spread over the each of the two clamp regions. Therefore, if a total clamping force of 120N is used for a 12-fiber ribbon, each fiber is clamped by a force of 5N at each clamping point. Assuming a coefficient of friction of 0.4 or larger, a tension of up to 2N can be maintained in each fiber. Preferably, the upper and lower clamping surfaces for both clamping points should be coated with elastomeric material so that the coefficient of friction of the clamp is as large as possible and there is little damage to the glass optical fiber during clamping. The elastomeric clamps and their supports should be of dimensions to make them sufficiently resilient so that enough force is required to distort the clamps so that each fiber is clamped with sufficient force. Smaller coefficients of friction will lead to slipping of the fiber in the clamps and so lower tension would be present in the fiber. In the case of reduced tension in the fiber, the resultant cleave would be less reliable and have a larger glass roll-off.

It is also appreciated that a similar cleave tool can be used to cleave a single or multi-fiber ribbon with a substantially perpendicular end face using the arrangement of a two-armed anvil and a perpendicular blade shown in FIG. 7a. The fiber or fibers are bent down in to the gap between the clamping surfaces so that they come in to contact with the diamond blade. In order to achieve a flat, perpendicular cleave without the presence of glass roll-off, all regions of the cross-section of the fiber(s) should be under tension. Therefore, it is desirable to use clamping surfaces 5a, 5b which are sloped as shown in FIG. 17. This will have the effect of generating extra tension in all of the fibers in a ribbon and so all of the fibers' cross-section is under tension. It is also desirable to alter the end angle of such cleaves so that they are very close to 90° to the optic axis. Such tuning of the end angles can be achieved by altering the relative height of each arm of the two-armed anvil or by altering the relative height of the two clamping surfaces 5a, 5b or by moving the lateral position of the inside edges of the clamping holes or the lateral position of the anvil and blade, all of which change the symmetry of the cleave. Such alterations will affect the end angle of each fiber in a ribbon by similar amounts.

Figure 18A:
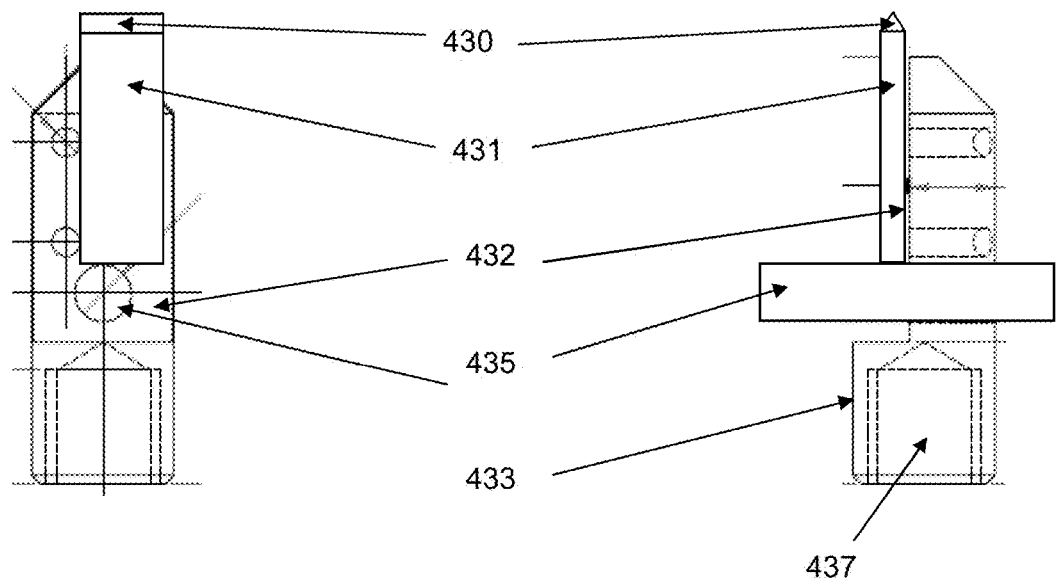
FIG. 18a shows orthogonal views of a polished diamond blade 430 attached to a steel shank 431 which is glued to a metal support 432 and the shank's height is set by resting on top of a cross-dowel 435.

The diamond blade assembly is shown in FIG. 18a in orthogonal views. A piece of single crystal diamond 430 is attached to a steel shank 431. The diamond is oriented and polished on the {111} crystallographic faces to produce a sharp edge in a <110> direction; this is the sharp edge which scratches the fiber. The shank is attached to a flat machined face 432 on a dowel 433 with the shank held vertical by two alignment dowels 434 (or similar wall). The bottom of the shank is pushed on to a cross dowel 435 which passes through the steel shank 431. The cross-dowel 435 is placed in the extruded V-groove 436 in the main chassis. The blade assembly is fixed in to the chassis by a screw fixing 437 so that the cross-dowel 435 is pulled down in to the extruded V-groove 436.

Figure 18B:
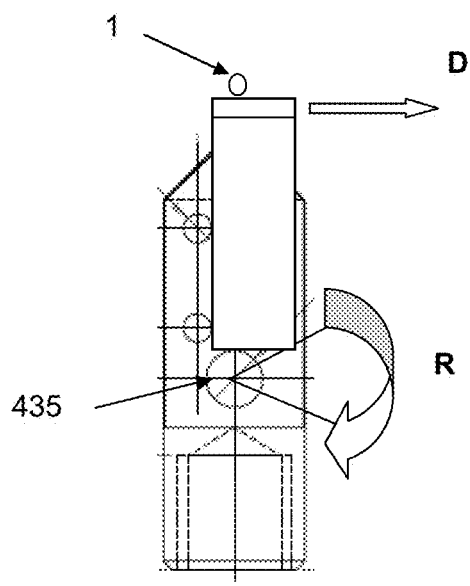
FIG. 18b shows the blade being moved with respect to the fiber 1 by rotation of the support around the cross-dowel.

The sharp diamond edge (up to 3.5 mm long or greater) is long compared to the contact length of approximately 50

µm required to scratch the fiber. Therefore, when one position is blunted, the diamond blade can be indexed on to use a new, unused portion of the blade for subsequent scratching and cleaving. Preferentially, the blade can be moved by swinging about the cross-dowel. Four cleaving positions or more are possible for a single diamond blade cleaving a single fiber without substantial change in the blade height. If the screw securing the blade assembly is released, the assembly shown in FIG. 18b can be rotated in direction R around the cross-dowel 435 by a small angled so that the blade moves in direction D, bringing a new section of sharp edge in to contact with the fiber 1 and the screw re-tightened. A movement, D, of up to 1 mm, representing 4 or more blade positions, each 333 µm apart, can be achieved with minimal change in height of the blade and therefore substantially identical cleave conditions are achieved.

Alternatively, the diamond blade may be indexed to a new position if the blade assembly is mounted on a block and this block is dragged in a direction along the length of the sharp edge, perpendicular to the axis of the optical fiber(s) and so allow a new blade position to scratch the fiber(s). The block can be mounted on parallel dowels or similar.

The tool and the positioning of the fiber holder may also be arranged so that either the direction of operation of the tool or the orientation of the fiber holder is rotated by 90° so that the orientation of the angled end is rotated by 90° with respect to the base of the fiber holder. This may be beneficial if two such cleaved fibers ends are to be butted together in a mechanical splice because the two angled ends will then be matched with a minimal air gap, leading to reduced insertion loss in the optical splice.

The tool may also have a provision for collection of the cleaved fiber offcuts. These offcuts must be removed from the tool to prevent them interfering with the cleaving of the next fiber or fiber ribbon. The fiber offcuts can be ejected in a direction substantially parallel to the optic axis and the ejected fibers are conveniently gathered in to a scrap bin. Prior to cleaving, the stripped distal end of the fibers may be positioned so that they pass over a lower compliant roller. As the tool is operated, a second roller descends on to the lower roller, trapping the distal ends of the fibers between the two rollers. After the fibers are cleaved, a mechanism causes one or both of the rollers to rotate, ejecting the fibers from the tool. After fiber ejection, the mechanism also causes the upper roller to rise up to allow insertion of the subsequent fiber or fiber ribbon.

In summary, this invention allows the shaping of angled cleave(s) of an optical fiber or array of fibers to control the shape of the cleaved end(s) and the protrusion of glass beyond the core of the fiber(s). The orientation of the angle cleaved ends face is controlled and so allows low insertion splicing of optical fibers and connectors. This control of the orientation and shape of the end face may be used advantageously to splice and optical fiber and/or an optical connector. A cleave tool which can make the inventive cleaves, or can make prior art angled cleaves is also presented.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for cleaving one or more optical fibers at an angle to an optic axis, the method comprising:
   clamping said at least one optical fiber, with its coating stripped to expose a glass distal end of the one or more fibers, at a first clamping position and a second clamping position spaced apart therefrom such that the at least one fiber extends along an undeflected longitudinal axis coincident with a line taken between the first and second clamping positions;
   providing a sharp blade having a blade edge formed by an intersection of two polished surfaces of the blade, the blade positioned between the first and second clamping positions, the blade orientated such the blade edge extends perpendicular to the undeflected longitudinal axis of the optical fiber, and such that a plane bisecting a blade angle formed between the two polished surfaces of the blade is slanted at an angle in the range of 18° to 45° relative to a plane perpendicular to the undeflected longitudinal axis of said fiber; and
   scratching said at least one optical fiber with said sharp blade to create a non-perpendicular cleave having a controlled shape in a region of the scratch.

2. The method according to claim 1 further comprising applying one or more of an axial force and a bending force to said at least one optical fiber so as to create internal stresses therein and such that the at least one optical fiber is deflected away from the undeflected longitudinal axis between the first and second clamping positions and adjacent to the sharp blade.

3. The method according to claim 2 further comprising applying a clamping force to said at least one optical fiber and wherein application of said clamping force applies a longitudinal axial force to the fiber.

4. The method according to claim 3 wherein applying a clamping force comprises progressively clamping said fiber simultaneously at the first and second clamping positions using two clamps having oppositely angled surfaces such that the fiber is initially clamped at an outermost part of the clamps, and the clamping force progresses from the outermost part of the clamps to an innermost part of the clamp so as to applying a longitudinal axial force to the fiber as it is stretched against said two oppositely angled surfaces, wherein the undeflected longitudinal axis is coincident with the line taken between the first and second clamping positions taken at the outermost part of the clamps.

5. The method according to claim 1 wherein the plane bisecting the blade angle is applied at an angle of 20-40 degrees relative to the plane perpendicular to the undeflected longitudinal axis of the at least one optical fiber.

6. The method according to claim 5 wherein the plane bisecting the blade angle is applied at an angle of 25-35 degrees relative to the plane perpendicular to the undeflected longitudinal axis of the at least one optical fiber.

7. The method according to claim 1 wherein the plane bisecting the blade angle is slanted towards the distal end of the at least one optical fiber such that the angle cleaved fiber end has a reduced glass protrusion beyond the core of the fiber, the distal end extending along the undeflected longitudinal axis of the at least one optical fiber.

8. The method according to claim 7 wherein the at least one fiber is a single-mode fiber.

9. The method according to claim 1 wherein the plane bisecting the blade angle is slanted away from distal end of the at least one optical fiber such that the angle cleaved fiber end has a large proportion of its cleaved end face at an angle to the optic axis, the distal end extending along the undeflected longitudinal axis of the at least one optical fiber.

10. The method according to claim 9 wherein the at least one fiber is a multimode fiber.

11. The method according to claim 1 wherein the plane bisecting the blade angle is slanted at an angle to the plane perpendicular to the undeflected longitudinal axis of the fiber equal to, or greater than, half of the blade angle.

12. A method of joining two optical fibers, or two optical fiber ribbons, the method comprising:
cleaving the ends of a first and a second optical fiber, or optical fiber ribbons, according to the method of claim 1, and
joining the two cleaved ends in an optical splice.

13. The method according to claim 12 further comprising:
orientating one of said first and second optical fibers or optical fiber ribbons such that its cleave is inverted relative to the cleave of the other of said first and second optical fibers or optical fiber ribbons;
aligning the cleaved ends said first and second optical fibers or optical fiber ribbons; and
clamping the optical fiber or optical fiber ribbons with said cleaved ends aligned and inverted.

14. The method according to claim 12 further comprising placing said optical fiber or optical fiber ribbon in a fiber holder provided with orientation identifier on at least one side thereof, and wherein orientating said optical fiber or said optical fiber ribbon comprises using said orientation identifier to orientate said fiber holder.

15. A method of joining an optical fiber, or an optical fiber ribbon, to an optical connector having an angle cleaved optical fiber stub, the method comprising
cleaving the end of at least one optical fiber or optical fiber ribbon according to the method of claim 1, and
joining the cleaved end to an optical connector.

16. The method according to claim 15 further comprising
orientating the cleaved end the optical fiber or optical fiber ribbon with said optical fiber stub of the connector such that the angles of the two cleaved ends are inverted relative to one another in opposite alignment so as to minimise the separation thereof; and
clamping the optical fiber with the optical fiber stub with said cleaved ends in said opposite alignment.

17. The method of claim 1 wherein the first and second clamping positions have a first and second clamping surface, respectively, the first and second clamping surfaces being co-planar with one another, the undeflected longitudinal axis of the at least one optical fiber lying in a plane defined by the first and second clamping surfaces.

18. The method of claim 1 further comprising tensioning and bending the at least one optical fiber with an anvil positioned between the first and second clamping positions to apply at least one of an axial force and a bending force to the at least one optical fiber such that the at least one optical fiber is stressed and deflected between the first and second clamping positions and adjacent to the sharp blade.

19. The method of claim 1 further comprising deflecting the at least one optical fiber between the first and second clamping positions by a pre-set distance away from the undeflected longitudinal axis to introduce internal stresses in the at least one optical fiber.

20. A method for cleaving an optical fiber at an angle to an optic axis, the method comprising:
providing an unstressed optical fiber extending along an undeflected longitudinal axis with its coating stripped;
clamping the optical fiber at a first clamping position and a second clamping position spaced apart therefrom;
deflecting the optical fiber with an anvil positioned between the first and second clamping positions such that the optical fiber is tensioned and bent away from the undeflected longitudinal axis between the first and second clamping positions and is stressed therebetween;
providing a sharp blade having a blade edge formed by an intersection of two polished surfaces of the blade, the blade positioned between the first and second clamping positions, the blade orientated such the blade edge extends perpendicular to the undeflected longitudinal axis of the optical fiber, and such that a plane bisecting a blade angle formed between the two polished surfaces of the blade is slanted at an angle in the range of 18° to 45° relative to a plane perpendicular to the undeflected longitudinal axis of the optical fiber; and
scratching the stressed optical fiber with the sharp blade to create a non-perpendicular cleave having a controlled shape in a region of the scratch.

21. The method of claim 20 wherein the unstressed optical fiber is provided on a cutting table to extend along the undeflected longitudinal axis with its coating stripped, a plane of the cutting table defined by the undeflected longitudinal axis; and
wherein the plane bisecting a blade angle formed between the two polished surfaces of the blade is slanted at the angle in the range of 18° to 45° relative to a plane perpendicular to the plane of the cutting table.

* * * * *

UNITED STATES PATENT AND TRADEMARK OFFICE
CERTIFICATE OF CORRECTION

| | | |
|---|---|---|
| PATENT NO. | : 9,933,571 B2 | Page 1 of 1 |
| APPLICATION NO. | : 13/844897 | |
| DATED | : April 3, 2018 | |
| INVENTOR(S) | : Ian Murgatroyd | |

It is certified that error appears in the above-identified patent and that said Letters Patent is hereby corrected as shown below:

In the Claims

Column 28, Line 14, Claim 1:
After "the blade orientated such"
Insert -- that --.

Column 28, Lines 40-41, Claim 4:
After "part of the clamp so as to"
Delete "applying" and
Insert -- apply --.

Column 30, Line 28, Claim 20:
After "the blade orientated such"
Insert -- that --.

Signed and Sealed this
Nineteenth Day of June, 2018

Andrei Iancu
*Director of the United States Patent and Trademark Office*